United States Patent
Chen et al.

(10) Patent No.: US 10,955,978 B2
(45) Date of Patent: *Mar. 23, 2021

(54) TOUCH SENSOR PANEL WITH TOP AND/OR BOTTOM SHIELDING

(71) Applicant: Apple Inc., Cupertino, CA (US)

(72) Inventors: Sz-Hsiao Chen, Osaka (JP); Chun-Hao Tung, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/588,845

(22) Filed: Sep. 30, 2019

(65) Prior Publication Data

US 2020/0033983 A1    Jan. 30, 2020

Related U.S. Application Data

(63) Continuation of application No. 15/713,361, filed on Sep. 22, 2017, now Pat. No. 10,429,974.
(Continued)

(51) Int. Cl.
*G06F 3/044* (2006.01)
*G02F 1/1333* (2006.01)
(Continued)

(52) U.S. Cl.
CPC ........ *G06F 3/0445* (2019.05); *G02F 1/13338* (2013.01); *G02F 1/13439* (2013.01);
(Continued)

(58) Field of Classification Search
CPC .................. G06F 3/0412; G06F 3/044; G06F 2001/134372; G06F 2203/04103;
(Continued)

(56) References Cited

U.S. PATENT DOCUMENTS

| 5,483,261 A | 1/1996 | Yasutake |
| 5,486,204 A | 1/1996 | Clifton |

(Continued)

FOREIGN PATENT DOCUMENTS

| CN | 101477430 A | 7/2009 |
| CN | 101719038 A | 6/2010 |

(Continued)

OTHER PUBLICATIONS

International Search Report dated Dec. 15, 2017, for PCT Application No. PCT/US2017/053075, 4 pages.
(Continued)

*Primary Examiner* — Peter D McLoone
(74) *Attorney, Agent, or Firm* — Kubota & Basol LLP

(57) ABSTRACT

A touch sensor panel is disclosed. The touch sensor panel can include a first substrate layer; a first electrode layer comprising one or more of a touch electrode and a trace configured to couple the touch electrode to sense circuitry, the first electrode layer located on a first side of the first substrate layer; a second electrode layer located on the first side of the first substrate layer; a passivation layer disposed in between the first electrode layer and the second electrode layer; and a third electrode layer located on a second side of the first substrate layer, different from the first side of the first substrate layer. The first electrode layer can be comprised of a first conductive material, the second electrode layer can be comprised of a second conductive material, and the third electrode layer can be comprised of a third conductive material. The touch sensor panel may not include a second substrate layer between the first substrate layer and the second electrode layer.

20 Claims, 15 Drawing Sheets

Related U.S. Application Data

(60) Provisional application No. 62/399,182, filed on Sep. 23, 2016.

(51) Int. Cl.
  *G02F 1/1343* (2006.01)
  *G02F 1/1345* (2006.01)
  *G02F 1/1362* (2006.01)
  *G06F 3/041* (2006.01)

(52) U.S. Cl.
  CPC .... *G02F 1/13454* (2013.01); *G02F 1/134336* (2013.01); *G02F 1/136204* (2013.01); *G06F 3/0412* (2013.01); *G06F 3/0446* (2019.05); *G02F 2001/134372* (2013.01); *G06F 2203/04103* (2013.01); *G06F 2203/04107* (2013.01); *G06F 2203/04108* (2013.01); *G06F 2203/04112* (2013.01)

(58) Field of Classification Search
  CPC . G06F 2203/04107; G06F 2203/04108; G06F 2203/04112; G02F 1/13338; G02F 1/134336; G02F 1/13439; G02F 1/13454; G02F 1/136204
  See application file for complete search history.

(56) References Cited

U.S. PATENT DOCUMENTS

| | | |
|---|---|---|
| 5,488,204 A | 1/1996 | Mead et al. |
| 5,574,262 A | 11/1996 | Petty |
| 5,579,036 A | 11/1996 | Yates, IV |
| 5,680,411 A | 10/1997 | Ramdane et al. |
| 5,825,352 A | 10/1998 | Bisset et al. |
| 5,835,079 A | 11/1998 | Shieh |
| 5,844,506 A | 12/1998 | Binstead |
| 5,847,690 A | 12/1998 | Boie et al. |
| 5,880,411 A | 3/1999 | Gillespie et al. |
| 6,057,903 A | 5/2000 | Colgan et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,373,474 B1 | 4/2002 | Katabami |
| 6,690,387 B2 | 2/2004 | Zimmerman et al. |
| 6,847,354 B2 | 1/2005 | Vranish |
| 7,015,894 B2 | 3/2006 | Morohoshi |
| 7,184,064 B2 | 2/2007 | Zimmerman et al. |
| 7,248,249 B2 | 7/2007 | Kong et al. |
| 7,327,352 B2 | 2/2008 | Keefer et al. |
| 7,570,064 B2 | 8/2009 | Roziere |
| 7,663,607 B2 | 2/2010 | Hotelling et al. |
| 8,149,002 B2 | 4/2012 | Ossart et al. |
| 8,159,213 B2 | 4/2012 | Roziere |
| 8,479,122 B2 | 7/2013 | Hotelling et al. |
| 8,587,533 B2 | 11/2013 | Nishihara et al. |
| 8,614,690 B2 | 12/2013 | Grunthaner et al. |
| 8,698,770 B2 | 4/2014 | Chen |
| 8,770,033 B2 | 7/2014 | Roziere |
| 8,829,926 B2 | 9/2014 | Zachut et al. |
| 8,917,256 B2 | 12/2014 | Roziere |
| 8,923,014 B2 | 12/2014 | Kim et al. |
| 9,007,343 B1 | 4/2015 | Ludden |
| 9,035,903 B2 | 5/2015 | Binstead |
| 9,104,283 B2 | 8/2015 | Roziere et al. |
| 9,146,414 B2 | 9/2015 | Chang et al. |
| 9,298,327 B2 | 3/2016 | Wenzel |
| 9,322,633 B2 | 4/2016 | Yilmaz et al. |
| 9,354,659 B2 | 5/2016 | Shin et al. |
| 9,430,180 B2 | 8/2016 | Hirakata et al. |
| 2002/0000977 A1 | 1/2002 | Vranish |
| 2005/0110772 A1 | 5/2005 | Kong et al. |
| 2005/0219230 A1 | 10/2005 | Nakayama et al. |
| 2005/0237439 A1 | 10/2005 | Mai |
| 2006/0097733 A1 | 5/2006 | Roziere |
| 2006/0197753 A1 | 9/2006 | Hotelling |
| 2006/0266640 A1 | 11/2006 | Halsey et al. |
| 2008/0062139 A1 | 3/2008 | Hotelling et al. |
| 2008/0284261 A1 | 11/2008 | Andrieux et al. |
| 2009/0096767 A1 | 4/2009 | Liu et al. |
| 2009/0146945 A1 | 6/2009 | Cho |
| 2009/0231300 A1 | 9/2009 | Kyle |
| 2009/0231301 A1 | 9/2009 | Chang et al. |
| 2010/0052700 A1 | 3/2010 | Yano et al. |
| 2010/0123681 A1 | 5/2010 | Wu et al. |
| 2010/0163394 A1 | 7/2010 | Tang et al. |
| 2010/0201647 A1* | 8/2010 | Verweg ............... G06F 3/044 345/174 |
| 2010/0220071 A1 | 9/2010 | Nishihara et al. |
| 2010/0287470 A1 | 11/2010 | Homma et al. |
| 2010/0315374 A1 | 12/2010 | Chen et al. |
| 2011/0063247 A1 | 3/2011 | Min |
| 2011/0102338 A1 | 5/2011 | Liu et al. |
| 2011/0169783 A1 | 7/2011 | Wang et al. |
| 2011/0216018 A1 | 9/2011 | Kim et al. |
| 2011/0227847 A1 | 9/2011 | Yoshiyama |
| 2011/0234491 A1 | 9/2011 | Nurmi |
| 2011/0285661 A1 | 11/2011 | Hotelling |
| 2011/0304582 A1 | 12/2011 | Ho et al. |
| 2012/0008266 A1 | 1/2012 | Nomura |
| 2012/0031746 A1 | 2/2012 | Hwang et al. |
| 2012/0044662 A1 | 2/2012 | Kim et al. |
| 2012/0062472 A1 | 3/2012 | Yilmaz |
| 2012/0109543 A1 | 5/2012 | Weinstein et al. |
| 2012/0113038 A1 | 5/2012 | Chen |
| 2012/0187965 A1 | 7/2012 | Roziere |
| 2012/0188200 A1 | 7/2012 | Roziere |
| 2012/0234663 A1 | 9/2012 | Hwang et al. |
| 2013/0033450 A1 | 2/2013 | Coulson et al. |
| 2013/0100038 A1 | 4/2013 | Yilmaz et al. |
| 2013/0135247 A1 | 5/2013 | Na et al. |
| 2013/0307776 A1 | 11/2013 | Roziere |
| 2014/0043292 A1* | 2/2014 | Hashimoto ............... H05K 1/11 345/174 |
| 2014/0049271 A1 | 2/2014 | Trend |
| 2014/0063373 A1 | 3/2014 | Wu et al. |
| 2014/0132335 A1 | 5/2014 | Rauhala et al. |
| 2014/0320199 A1 | 10/2014 | Trend et al. |
| 2014/0320451 A1 | 10/2014 | Lee et al. |
| 2015/0035792 A1 | 2/2015 | Roziere et al. |
| 2015/0068897 A1 | 3/2015 | Neel et al. |
| 2015/0145818 A1 | 5/2015 | Jeon et al. |
| 2015/0205326 A1 | 7/2015 | Lim |
| 2015/0309633 A1 | 10/2015 | Ho et al. |
| 2015/0346866 A1 | 12/2015 | Kusunoki et al. |
| 2016/0147319 A1 | 5/2016 | Agarwal et al. |
| 2016/0188098 A1 | 6/2016 | Her et al. |
| 2016/0209668 A1 | 7/2016 | Maeda et al. |
| 2016/0229154 A1 | 8/2016 | Yeh et al. |
| 2016/0246435 A1 | 8/2016 | Kim et al. |
| 2016/0266693 A1 | 9/2016 | Chen et al. |
| 2016/0291717 A1 | 10/2016 | Fu et al. |
| 2016/0306458 A1 | 10/2016 | Hong et al. |
| 2017/0357369 A1 | 12/2017 | Liu et al. |
| 2018/0088717 A1 | 3/2018 | Chen et al. |
| 2018/0157353 A1 | 6/2018 | Sleeman et al. |
| 2018/0157354 A1 | 6/2018 | Blondin et al. |

FOREIGN PATENT DOCUMENTS

| | | |
|---|---|---|
| CN | 101813844 A | 8/2010 |
| CN | 202142025 U | 2/2012 |
| CN | 102375603 A | 3/2012 |
| EP | 2267791 A2 | 12/2010 |
| EP | 2392994 A1 | 12/2011 |
| FR | 2756048 A1 | 5/1998 |
| JP | 2000-163031 A | 6/2000 |
| JP | 2002-342033 A | 11/2002 |
| JP | 2010-218542 A | 9/2010 |
| JP | 2011-198009 A | 10/2011 |
| WO | 2004/023067 A2 | 3/2004 |
| WO | 2004/023067 A3 | 3/2005 |

(56) References Cited

FOREIGN PATENT DOCUMENTS

| WO | 2007/060324 A1 | 5/2007 |
|----|----------------|--------|
| WO | 2016/000281 A1 | 1/2016 |
| WO | 2018/057969 A1 | 3/2018 |

OTHER PUBLICATIONS

Lee et al., "A Multi-Touch Three Dimensional Touch-Sensitive Tablet", Proceedings of CHI: ACM Conference on Human Factors in Computing Systems, Apr. 1985, pp. 21-25.
Non-Final Office Action received for U.S. Appl. No. 15/713,361, dated Nov. 16, 2018, 12 pages.
Notice of Allowance received for U.S. Appl. No. 15/713,361, dated May 17, 2019, 8 pages.
Rubine, Dean H., "Combining Gestures and Direct Manipulation", CHI '92, May 3-7, 1992, pp. 659-660.
Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 364 pages.

\* cited by examiner

TOUCH SENSOR PANEL WITH TOP AND/OR BOTTOM SHIELDING

CROSS REFERENCE TO RELATED APPLICATION

This application is a continuation of U.S. application Ser. No. 15/713,361, filed Sep. 22, 2017 and published on Mar. 29, 2018 as U.S. Publication No. 2018-0088717, which claims the benefit under 35 USC 119(e) of U.S. patent application Ser. No. 62/399,182, filed Sep. 23, 2016, the contents of which are incorporated herein by reference in their entirety for all purposes.

FIELD OF THE DISCLOSURE

This relates generally to touch sensor panels, and more particularly to touch sensor panels that are shielded from external noise.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Some capacitive touch sensor panels can be formed by a matrix of plates (e.g., touch electrodes) made of conductive materials (e.g., Indium Tin Oxide (ITO)) and coupled to routing traces made of a conductive material (e.g., copper). In some examples, plates and routing traces may be formed of the same conductive material. In some examples, a routing trace may comprise a first portion made of a first conductive material (e.g., ITO), and a second portion made of a second conductive material (e.g., copper), which in some examples may be overlaid onto the first conductive material. For instance, a first portion of a routing trace overlapping a viewable area of a display may be made of a transparent conductive material (e.g., ITO), such that the viewable area is visible through the first portion, while a second portion of the routing trace extending outside the viewable area may be made of an opaque conductive material (e.g., copper).

Some touch screens can be formed by at least partially integrating touch sensing circuitry into a display pixel stackup (i.e., the stacked material layers forming the display pixels). However, touch electrodes and routing traces can be susceptible to noise from above and/or below the touch sensor panel. For example, environmental noise, including capacitive coupling between objects above a touch sensor panel, such as human fingers, and routing traces, may interfere with proper operation of the touch sensor panel. Similarly, the display circuitry in a touch screen, which in some examples can be positioned below a touch sensor panel, may present noise that interferes with the ability of the touch sensor panel to detect changes in capacitance. It is desirable to shield touch electrodes and routing traces from noise from above and/or below the touch sensor panel. Some touch sensor panels accomplish this with a laminate including two layers of a substrate material (e.g., cyclo olefin polymer), with conductive materials applied to each of the two substrate layers. Fabricating a touch sensor panel using such a two-substrate structure can be costly and complex. Additionally, each substrate contributes to the thickness of the touch sensor panel. It is desirable to reduce the cost and complexity of fabricating touch sensor panels, and also to reduce the thickness of touch sensor panels, by eliminating the use of a substrate layer, or by substituting a substrate layer integrated in a display for a standalone substrate layer.

SUMMARY OF THE DISCLOSURE

Some examples of the disclosure are directed to reducing the cost and thickness of a touch sensor panel by eliminating a substrate layer, while retaining the ability to shield the touch sensor panel from noise sources. Some examples of the disclosure are directed to reducing the cost and thickness of a touch sensor panel by using a polarizer, such as may be integrated in a display, instead of a standalone substrate layer, while retaining the ability to shield the touch sensor panel from noise sources. It should be understood that, while the disclosure makes reference to touch screens by way of example, the disclosure is not limited to touch screens, but instead is also applicable to touch sensor panels that may or may not be integrated with a display.

BRIEF DESCRIPTION OF THE DRAWINGS

FIGS. 7A-7C, 7D-1, 7D-2 and 7D-3 illustrate exemplary structures and an exemplary process for forming a touch sensor panel with a single substrate layer, a touch electrode layer disposed above the substrate layer, a top shield electrode layer, and a bottom shield electrode layer, according to examples of the disclosure.

FIGS. 8A-8C, 8D-1, 8D-2, 8D-3, 8E, and 8F illustrate exemplary structures and an exemplary process for forming a touch sensor panel with a single substrate layer, a touch electrode layer disposed below the substrate layer, a top shield electrode layer, and a bottom shield electrode layer, according to examples of the disclosure.

FIGS. 9A-9D, 9E-1, 9E-2 and 9E-3 illustrate exemplary structures and an exemplary process for forming a touch sensor panel with a single standalone substrate layer, a touch electrode layer disposed below the substrate layer, a top shield electrode layer, a bottom shield electrode layer, and a polarizer, according to examples of the disclosure.

DETAILED DESCRIPTION

Figure 1A:
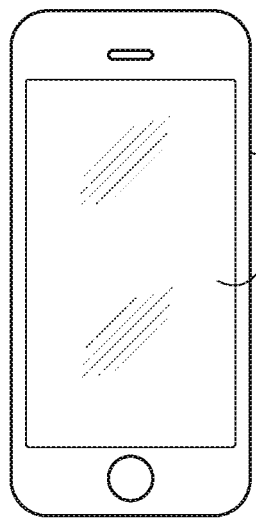
FIGS. 1A-1E illustrate an example mobile telephone, an example media player, an example personal computer, an example tablet computer, and an example wearable device that can each include an exemplary touch screen according to examples of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some capacitive touch sensor panels can be formed by a matrix of plates (e.g., touch electrodes) made of conductive materials (e.g., Indium Tin Oxide (ITO)) and coupled to routing traces made of a conductive material (e.g., copper). In some examples, plates and routing traces may be formed of the same conductive material. In some examples, a routing trace may comprise a first portion made of a first conductive material (e.g., ITO), and a second portion made of a second conductive material (e.g., copper), which in some examples may be overlaid onto the first conductive material. For instance, a first portion of a routing trace overlapping a viewable area may be made of a transparent conductive material (e.g., ITO) such that the viewable area is visible through the first portion, while a second portion of the routing trace extending outside the viewable area may be made of an opaque conductive material (e.g., copper).

Some touch screens can be formed by at least partially integrating touch sensing circuitry into a display pixel stackup (i.e., the stacked material layers forming the display pixels). However, touch electrodes and routing traces can be susceptible to noise from above and/or below the touch sensor panel. For example, environmental noise, including capacitive coupling between objects above a touch sensor panel, such as human fingers, and routing traces, may interfere with proper operation of the touch sensor panel. Similarly, the display circuitry in a touch screen, which in some examples can be positioned below a touch sensor panel, may present noise that interferes with the ability of the touch sensor panel to detect changes in capacitance. It is desirable to shield touch electrodes and routing traces from noise from above and/or below the touch sensor panel. Some touch sensor panels accomplish this by employing a stackup structure comprising three electrode layers: for example, such stackup structures may comprise a first substrate layer (e.g., a layer of cyclo olefin polymer) between a first and second electrode layer, and a second substrate layer between the second electrode layer and a third electrode layer. Fabricating a touch sensor panel using such a two-substrate structure can be costly and complex. Additionally, each substrate layer contributes to the thickness of the touch sensor panel. It is desirable to reduce the cost and complexity of fabricating touch sensor panels, such as three-electrode-layer touch sensor panels, and also to reduce the thickness of such panels, by eliminating the use of a substrate layer, or by substituting a substrate layer integrated in a display for a standalone substrate layer.

As described herein, the examples of the disclosure relate to touch sensor panels featuring three-electrode-layer stackups, for example in which each electrode layer comprises one or more electrodes in a display region of the touch panel. Some examples of the disclosure are directed to reducing the cost and thickness of such touch sensor panels by eliminating a substrate layer from conventional panels, while retaining the ability to shield the touch sensor panel from noise sources. For instance, as described in greater detail below, some examples of the disclosure are directed to reducing the cost and thickness of a touch sensor panel by replacing a conventional standalone substrate layer (e.g., between a first and second electrode layer) with a polarizer, such as may be integrated in a display, while retaining the ability to shield the touch sensor panel from noise sources. It should be understood that, while the disclosure makes reference to touch screens by way of example, the disclosure is not limited to touch screens, but instead is also applicable to touch sensor panels that may or may not be integrated with a display.

In the examples described herein, components of a touch sensor panel can be made from various materials. For instance, some examples of the disclosure make use of nanowire materials. Nanowire materials can be composed of networks of randomly distributed metal nanowires (e.g., silver or copper) suspended in a suitable carrier or solution. Compared to some conductive materials, such as ITO, nanowire materials can exhibit better mechanical flexibility and lower sheet resistance. In some examples, the fabrication process for creating nanowire materials can be relatively cost-effective in comparison to other materials. It should be understood that, where the disclosure makes reference to nanowire materials, the disclosure is not limited to nanowire materials comprised of any particular metal (e.g., silver or copper) or combination of metals.

Similarly, some examples of the disclosure make use of metal mesh materials. Metal mesh materials can be composed of micro- or nano-grids with periodic or non-periodic metal lines (e.g., Cu, Ni, Al, Au, etc.). Metal meshes can exhibit good mechanical flexibility, and low sheet resistance. Specifically, because the thicknesses of these metal lines can be much greater than that of some metal films (e.g., ITO films), the conductivity of metal mesh materials can be close to that of their bulk material counterparts, which can be significantly higher than that of metal films (e.g., ITO films).

Figure 1B:
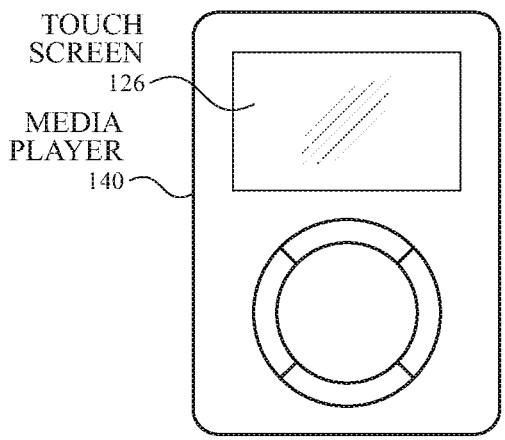
Figure 1C:
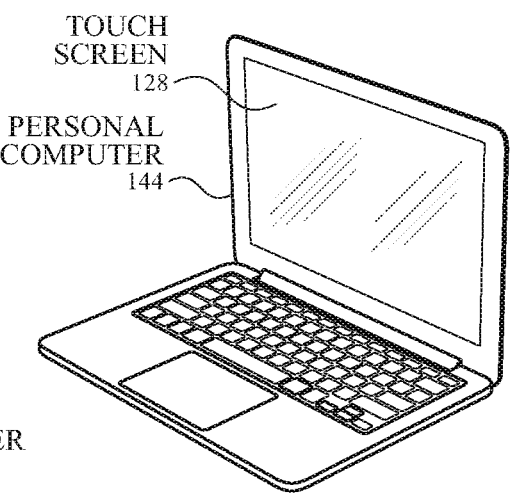
Figure 1D:
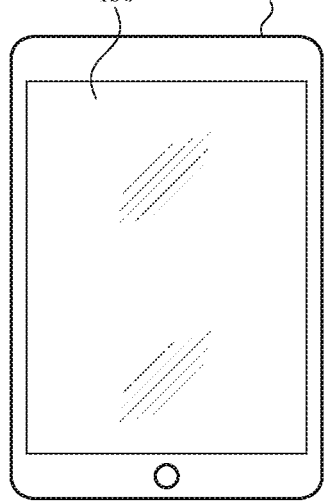
Figure 1E:
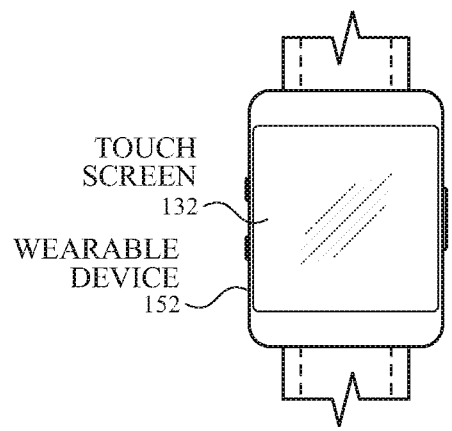

FIGS. 1A-1E illustrate example systems in which a touch screen according to examples of the disclosure may be implemented. FIG. 1A illustrates an example mobile telephone 136 that includes a touch screen 124. FIG. 1B illustrates an example digital media player 140 that includes a touch screen 126. FIG. 1C illustrates an example personal computer 144 that includes a touch screen 128. FIG. 1D illustrates an example tablet computer 148 that includes a touch screen 130. FIG. 1E illustrates an example wearable device 152 that includes a touch screen 132. It is understood that the above touch screens can be implemented in other devices as well, including in wearable devices.

In some examples, touch screens 124, 126, 128, 130, and 132 can be based on self-capacitance. A self-capacitance-based touch system can include a matrix of small, individual plates of conductive material that can be referred to as touch node electrodes (as described below with reference to touch screen 220 in FIG. 2). For example, a touch screen can include a plurality of individual touch node electrodes, each touch node electrode identifying or representing a unique location on the touch screen at which touch or proximity (i.e., a touch or proximity event) is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an AC waveform, and the self-capacitance to ground of the touch node electrode can be measured. As an object approaches the touch node electrode, the self-capacitance to ground of the touch node electrode can change. This change in the self-capacitance of the touch node electrode can be detected and measured by the touch sensing system to determine the positions of multiple objects when they touch, or come in proximity to, the touch screen. In some examples, the touch node electrodes of a self-capacitance-based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128, 130, and 132 can be based on mutual capacitance. A mutual-capacitance-based touch system can include drive and sense lines that may cross over each other on different layers, or that may be adjacent to each other on the same layer. The crossing or adjacent locations can be referred to as touch nodes. During operation, the drive line can be stimulated with an AC waveform and the mutual capacitance of the touch node can be measured. As an object approaches the touch node, the mutual capacitance of the touch node can change. This change in the mutual capacitance of the touch node can be detected and measured by the touch sensing system to determine the positions of multiple objects when they touch, or come in proximity to, the touch screen.

Figure 2:
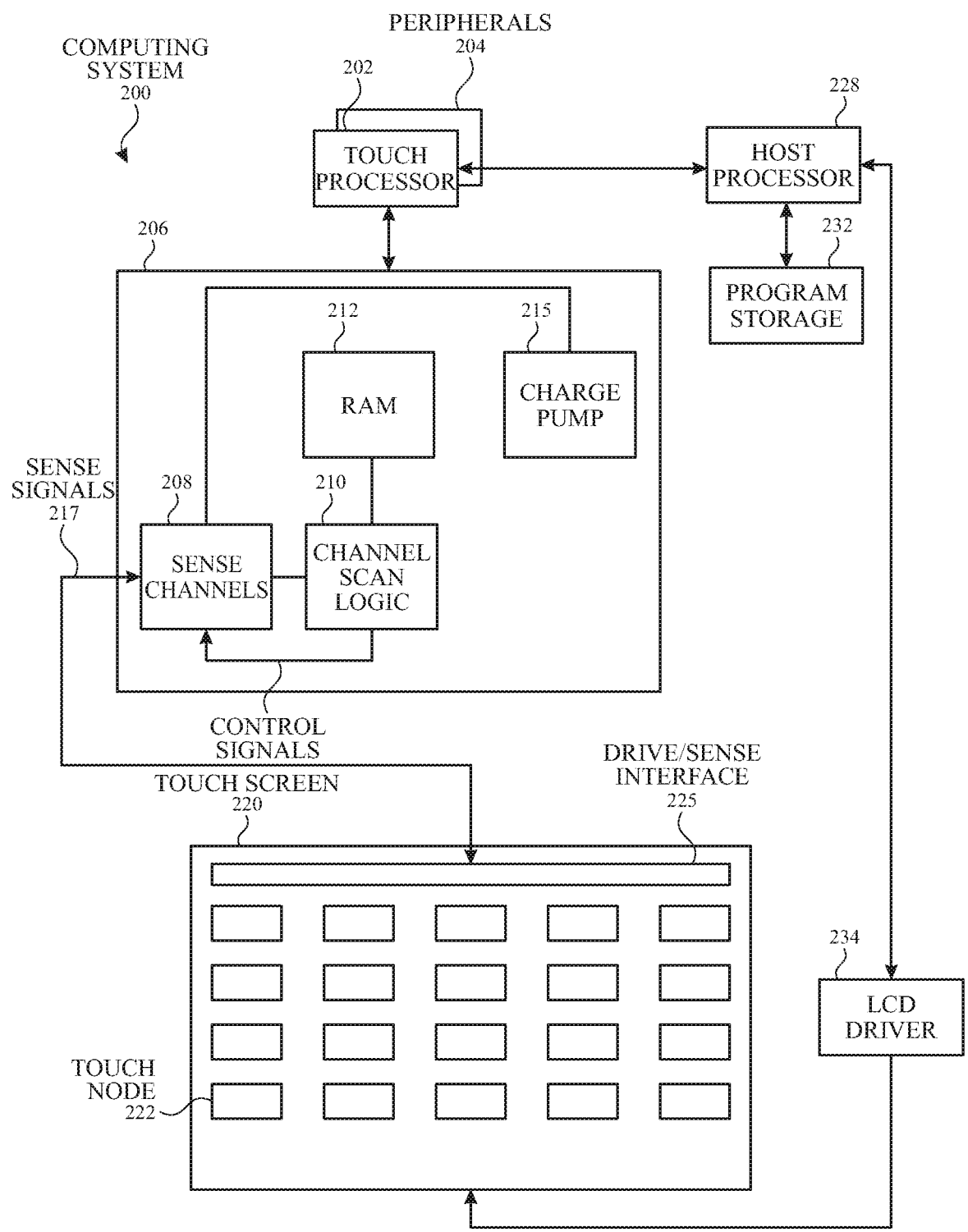
FIG. 2 is a block diagram of an example computing system that illustrates one implementation of an example self-capacitance touch screen according to examples of the disclosure.

FIG. 2 is a block diagram of an example computing system 200 that illustrates one implementation of an example self-capacitance touch screen 220 according to examples of the disclosure. It is understood that computing system 200 can instead include a mutual capacitance touch screen, as described above, though the examples of the disclosure will be described assuming a self-capacitance touch screen is provided. Computing system 200 can be included in, for example, mobile telephone 136, digital media player 140, personal computer 144, tablet computer 148, or any mobile or non-mobile computing device that includes a touch screen, including a wearable device. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208 and channel scan logic 210. Channel scan logic 210 can access RAM 212, autonomously read data from sense channels 208 and provide control for the sense channels. In addition, channel scan logic 210 can control sense channels 208 to generate stimulation signals at various frequencies and phases that can be selectively applied to the touch nodes of touch screen 220, as described in more detail below. In some examples, touch controller 206, touch processor 202 and peripherals 204 can be integrated into a single application specific integrated circuit (ASIC), and in some examples can be integrated with touch screen 220 itself.

Touch screen 220 can include touch sensing circuitry that can include a capacitive sensing medium having a plurality of electrically isolated touch node electrodes 222 (e.g., a pixelated self-capacitance touch screen). Touch node electrodes 222 can be coupled to sense channels 208 in touch controller 206, can be driven by stimulation signals from the sense channels through drive/sense interface 225, and can be sensed by the sense channels through the drive/sense interface as well, as described above. Labeling the conductive plates used to detect touch (i.e., touch node electrodes 222) as "touch node" electrodes can be particularly useful when touch screen 220 is viewed as capturing an "image" of touch (e.g., a "touch image"). In other words, after touch controller 206 has determined an amount of touch detected at each touch node electrode 222 in touch screen 220, the pattern of touch node electrodes in the touch screen at which a touch occurred can be thought of as a touch image (e.g., a pattern of fingers touching the touch screen).

Computing system 200 can also include a host processor 228 for receiving outputs from touch processor 202 and performing actions based on the outputs. For example, host processor 228 can be connected to program storage 232 and a display controller, such as an LCD driver 234. The LCD driver 234 can provide voltages on select (e.g., gate) lines to each pixel transistor and can provide data signals along data lines to these same transistors to control the pixel display image as described in more detail below. Host processor 228 can use LCD driver 234 to generate a display image on touch screen 220, such as a display image of a user interface (UI), and can use touch processor 202 and touch controller 206 to detect a touch on or near touch screen 220. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, including the configuration of switches, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic, or infrared wired or wireless propagation medium.

Figure 3A:
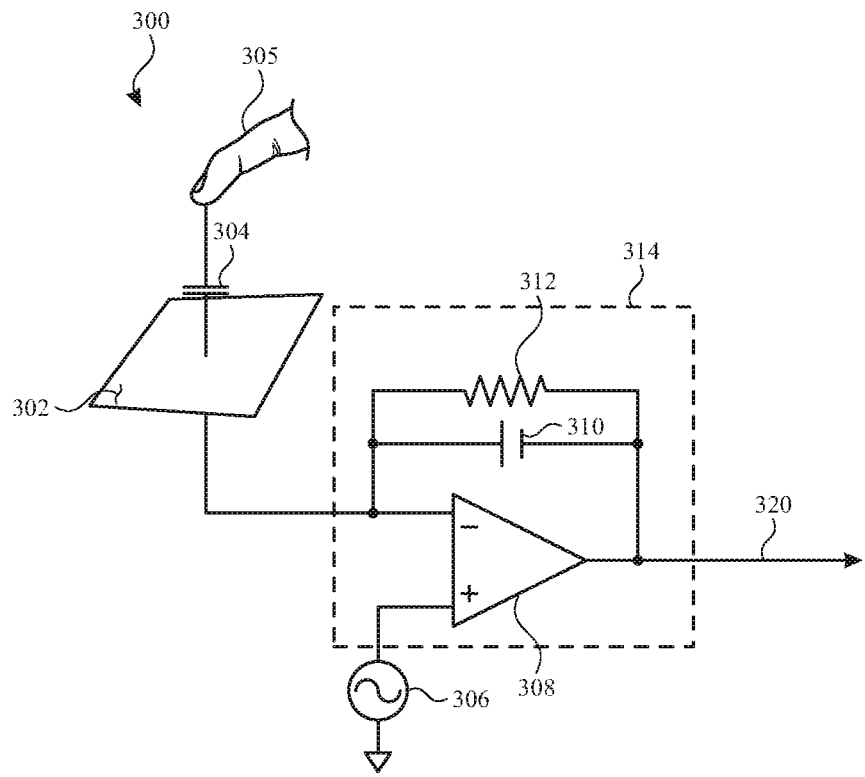
FIG. 3A illustrates an exemplary touch sensor circuit corresponding to a self-capacitance touch node electrode and sensing circuit according to examples of the disclosure.

FIG. 3A illustrates an exemplary touch sensor circuit 300 corresponding to a self-capacitance touch node electrode 302 and sensing circuit 314 according to examples of the disclosure. Touch node electrode 302 can correspond to touch node electrode 222. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 (Vac) can be coupled to the non-inverting input (+) of operational amplifier 308. Touch sensor circuit 300 can be configured to sense changes in the total self-capacitance 304 of the touch node electrode 302 induced by a finger or object either touching or in proximity to the touch sensor panel. Output 320 can be used by a processor to determine the presence of a proximity or touch event, or the output can be inputted into a discrete logic network to determine the presence of a proximity or touch event.

Figure 3B:
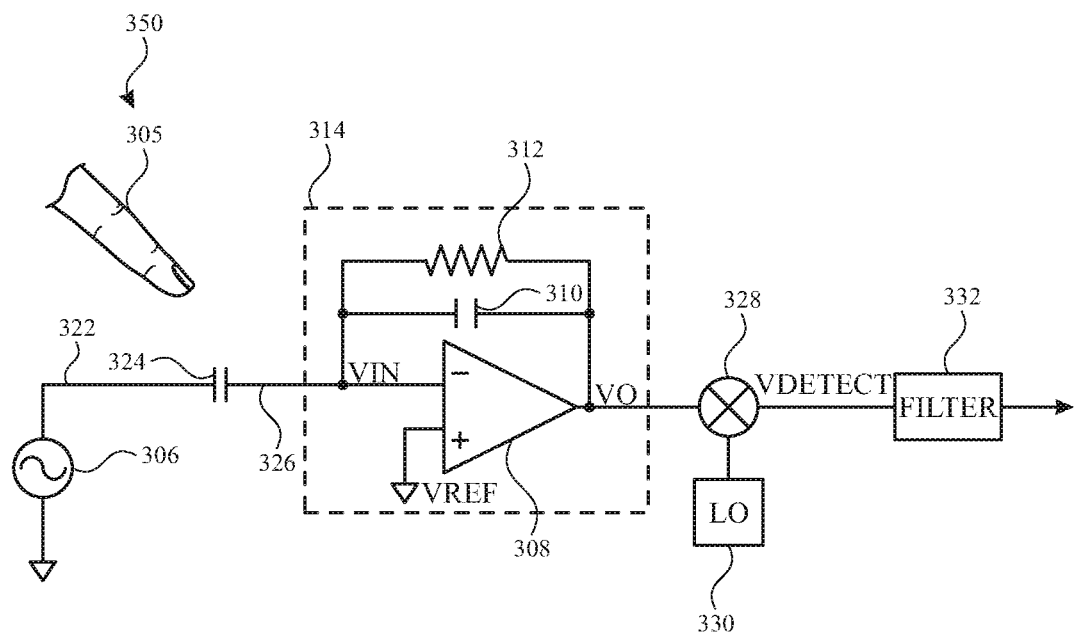
FIG. 3B illustrates an exemplary touch sensor circuit corresponding to a mutual-capacitance drive and sense line and sensing circuit according to examples of the disclosure.

FIG. 3B illustrates an exemplary touch sensor circuit 350 corresponding to a mutual-capacitance drive 322 and sense 326 line and sensing circuit 314 according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can be altered. This change in mutual capacitance 324 can be detected to indicate a touch or proximity event at the touch node, as described previously and below. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage Vref. Operational amplifier 308 can drive its output to voltage Vo to keep Vin substantially equal to Vref, and can therefore maintain Vin constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce Vdetect. Vdetect can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of Vdetect can be used to determine if a touch or proximity event has occurred.

Referring back to FIG. 2, in some examples, touch screen 220 can be an integrated touch screen in which touch sensing circuit elements of the touch sensing system can be integrated into the display pixel stackups of a display. The circuit elements in touch screen 220 can include, for example, elements that can exist in LCD or other displays, such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4B:
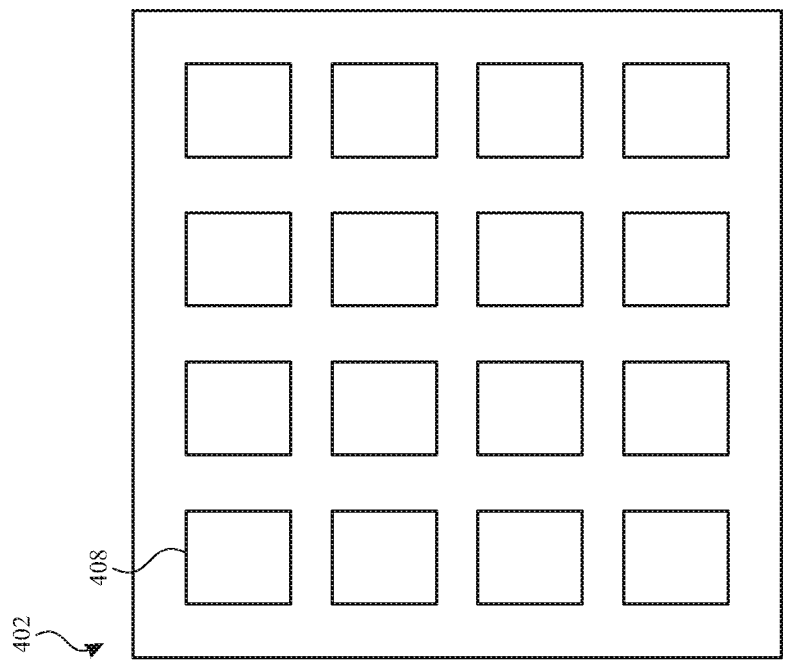
FIG. 4B illustrates an exemplary touch sensor panel with touch node electrodes arranged in a pixelated touch node electrode configuration according to examples of the disclosure.
Figure 4A:
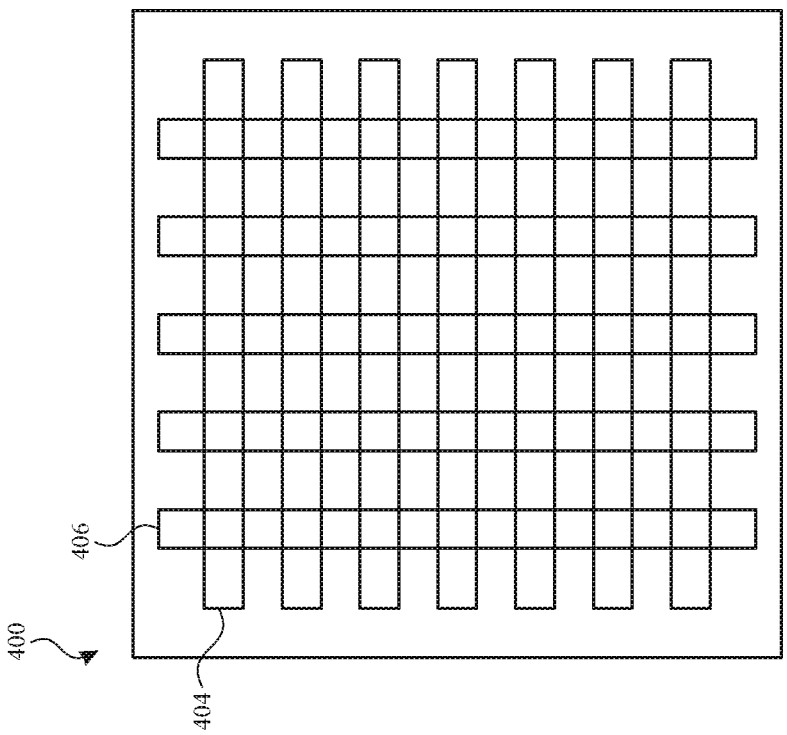
FIG. 4A illustrates an exemplary touch sensor panel with touch electrodes arranged in rows and columns according to examples of the disclosure.

FIG. 4A illustrates touch sensor panel 400 with touch electrodes 404 and 406 arranged in rows and columns according to examples of the disclosure. Specifically, touch sensor panel 400 can include a plurality of touch electrodes 404 disposed as rows, and a plurality of touch electrodes 406 disposed as columns. Touch electrodes 404 and/or touch electrodes 406 may be comprised of a conductive material (e.g., ITO). Touch electrodes 404 and touch electrodes 406 can be on the same or different material layers on touch sensor panel 400, and can intersect with each other, as illustrated in FIG. 4A. In some examples, touch sensor panel 400 can sense the self-capacitance of touch electrodes 404 and 406 to detect touch and/or proximity activity on touch sensor panel 400, and in some examples, touch sensor panel 400 can sense the mutual capacitance between touch electrodes 404 and 406 to detect touch and/or proximity activity on touch sensor panel 400.

FIG. 4B illustrates touch sensor panel 402 with touch node electrodes 408 arranged in a pixelated touch node electrode configuration according to examples of the disclosure. Specifically, touch sensor panel 402 can include a plurality of individual touch node electrodes 408, each touch node electrode identifying or representing a unique location on the touch sensor panel at which touch or proximity (i.e., a touch or proximity event) is to be sensed, and each touch node electrode being electrically isolated from the other touch node electrodes in the touch sensor panel, as previously described. Touch electrodes 404 and/or touch electrodes 406 may be comprised of a conductive material (e.g., ITO). Touch node electrodes 408 can be on the same or different material layers on touch sensor panel 402. In some examples, touch sensor panel 402 can sense the self-capacitance of touch node electrodes 408 to detect touch and/or proximity activity on touch sensor panel 402, and in some examples, touch sensor panel 402 can sense the mutual capacitance between touch node electrodes 408 to detect touch and/or proximity activity on touch sensor panel 402.

Touch electrodes, such as touch electrodes 404 and 406 in FIG. 4A and touch node electrodes 408 in FIG. 4B, can be susceptible to external noise that can compromise the ability of a touch sensor panel to detect touch and/or proximity activity. Additionally, touch electrodes may be coupled to routing traces that are susceptible to external noise. Such external noise can originate from below the touch sensor panel (for example, from a display in a touch screen), and/or from above the touch sensor panel (for example, from capacitive coupling between a routing trace and the environment external to the touch sensor). Routing traces, in particular, are susceptible to capacitive coupling caused by contact between a user's fingers and the routing traces, which can manifest as a false touch reading (e.g., noise) detected at touch electrode(s) corresponding to one or more of the routing traces. It is desirable to provide shielding from such noise sources above the touch sensor panel ("top shielding") and/or below the touch sensor panel ("bottom shielding").

Figure 5A:
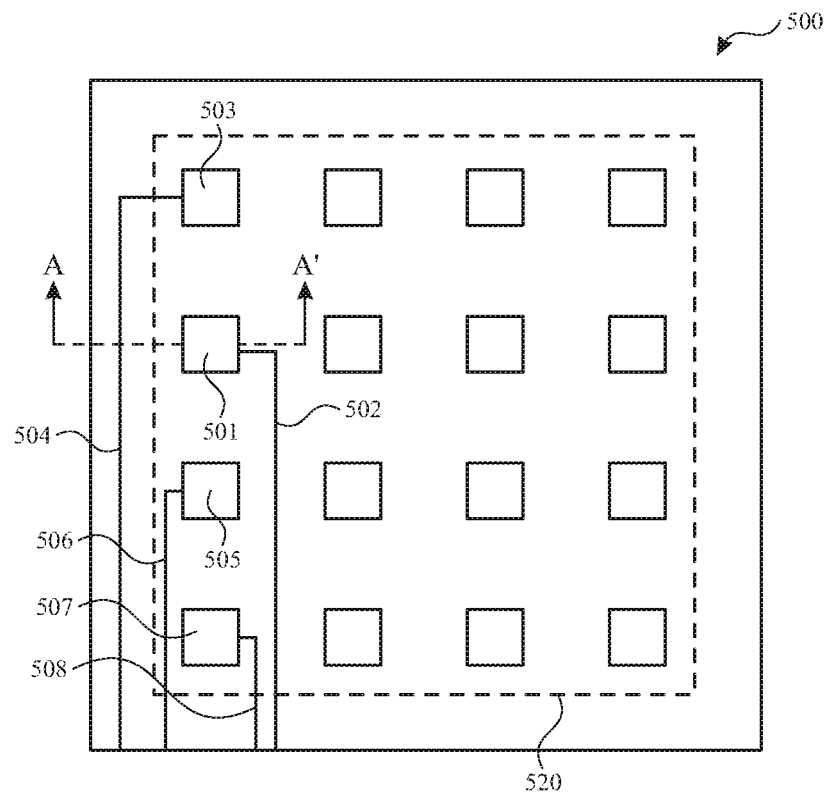
FIG. 5A illustrates a top view of an exemplary touch sensor panel according to examples of the disclosure.
Figure 5B:
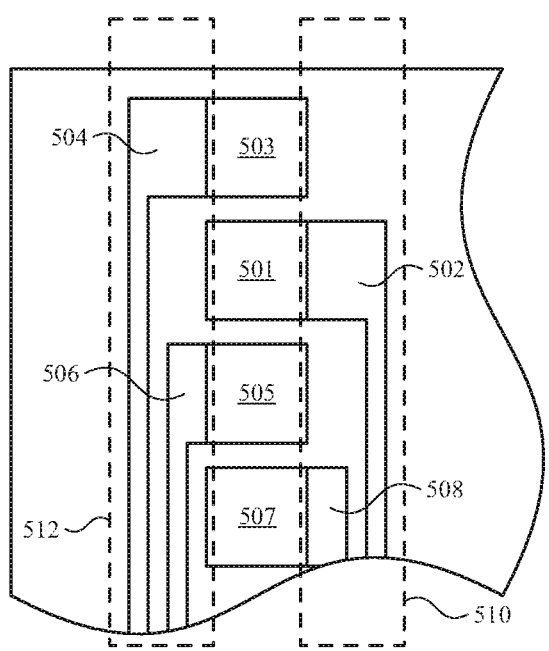
FIG. 5B illustrates a detail of a top view of an exemplary touch sensor panel according to examples of the disclosure.

FIGS. 5A and 5B illustrate a pixelated touch sensor panel 500 according to examples of the disclosure. FIG. 5A shows a top view of touch sensor panel 500. Referring to FIG. 5A, pixelated touch sensor panel 500 can include touch node electrodes 501, 503, 505, and 507 (e.g., as described with reference to FIG. 4B) and routing traces 502, 504, 506, and 508. In some examples, each routing trace may be coupled to one touch node electrode. That is, touch node electrode 501 can be coupled to sense circuitry (e.g., sense channels 208 in FIG. 2) via trace 502; touch node electrode 503 can be coupled to sense circuitry via trace 504; touch node electrode 505 can be coupled to sense circuitry via trace 506; and touch node electrode 507 can be coupled to sense circuitry via trace 508. (To simplify explanation, other touch node electrodes of touch sensor panel 500 are not shown coupled to routing traces in the figure, though it is understood that they may be.) In FIG. 5A, cross-section A-A' corresponds to an exemplary cross-section of touch sensor panel 500 intersecting touch node electrode 501 and traces 502 and 504. FIGS. 7A through 7C, 7D-1 through 7D-3, 8A through 8C, 8D-1 through 8D-3, 9A through 9D, and 9E-1 through 9E-3 illustrate example touch sensor panel stackups that will be described with respect to cross-section A-A' in FIG. 5A. In examples in which touch sensor panel 500 is part of a touch screen, a display (not shown) could be attached to a bottom surface of touch sensor panel 500. The examples of the disclosure should be understood to include examples in which a touch sensor panel is part of a touch screen, as well as examples in which a touch sensor panel is not part of a touch screen and is not associated with a display.

Some examples of the disclosure can include a conductive line 520 coupled to an electrode layer in touch sensor panel 500. The placement of conductive line 520 in a material stackup corresponding to touch sensor panel 500 will be discussed in more detail below. Conductive line 520 can be of a lower resistance than the electrode layer to which it is coupled, and the inclusion of conductive line 520 can thus lower the effective sheet resistance of that electrode layer. For example, conductive line 520 can be coupled to a shield electrode layer in touch sensor panel 500 to lower the effective sheet resistance of the shield electrode layer. Lowering this effective sheet resistance can allow touch sensor panel 500 to achieve better sensing performance, and potentially allow touch sensor panel 500 to scale to larger panel sizes more easily than would be possible without conductive line 520.

Conductive line 520 may include one or more traces or lines that traverse one or more portions of the perimeter of the touch sensor panel 500 (e.g., in a trace region that is neither above nor below a touch node electrode). In the example shown in FIG. 5A, conductive line 520 is shown as one contiguous region traversing the entire perimeter of touch sensor panel 500. In other examples, conductive line 520 can include multiple regions, such as two "C"-shaped regions separated by a gap. In some examples, conductive line 520 may not traverse the entire perimeter of touch sensor panel 500, but instead may only traverse a portion of the perimeter. Further, in some examples, an electrode layer may comprise two or more individually addressable electrodes (e.g., in touch sensor panels configured such that two or more regions, each corresponding to one or more individually addressable electrodes, perform different operations). In some such examples, each individually addressable electrode may correspond to an independent conductive line, such that the individually addressable electrodes are not electrically coupled.

In some examples, conductive line 520 may be made of copper, although other materials may be used. The examples of the disclosure are not limited to the use of any particular material for conductive line 520. Further, while some examples of the disclosure depict conductive line 520 as embedded in a stackup layer, the examples of the disclosure are not limited to a conductive line of any specific size, shape (e.g., linear segments), dimension, or geometric arrangement with respect to surrounding stackup layers. Nor are the examples of the disclosure limited to any particular method of forming a conductive line.

Compared to routing traces (e.g., routing traces 502, 504, 506, and 508 described below) for connecting a touch node electrode to sense circuitry, conductive line 520 does not provide a connective path between a touch node electrode and any circuitry external to touch sensor panel 500. Accordingly, in some examples, conductive line 520 may be disposed entirely within an electrode layer (e.g., a shield electrode layer) of touch sensor panel 500, such that some or all of conductive line 520 overlaps touch sensor panel 500. Such configurations can simplify the fabrication of touch sensor panels, for example by limiting the need to interface conductive line 520 to external circuitry (e.g., via interface circuitry, such as bonding pads). Similarly, the physical robustness of touch sensor panel 500 need not be comprised by a need to accommodate such interface circuitry, which may serve as a potential point of mechanical failure (e.g., by exposure to environmental hazards), or to otherwise interface conductive line 520 to external circuitry.

FIG. 5B shows a detail of example touch sensor panel 500 according to examples of the disclosure. In the example shown in FIG. 5B, touch node electrodes 501, 503, 505, and 507 are touch node electrodes belonging to a single column of touch sensor panel 500, and can be coupled to sense circuitry via traces 502, 504, 506, and 508, respectively, with each trace coupled to one touch node electrode, as described above. (Conductive line 520, shown in FIG. 5A, is not shown in FIG. 5B.) The touch node electrodes and traces in FIG. 5B are susceptible to noise, from above the touch sensor panel, that can interfere with the touch sensor panel's ability to detect touch input. It may be desirable to provide top shielding for such traces. However, top shielding may not be desired for the touch node electrodes, because top shielding may reduce the ability of an object (such as a user's finger) to interact with the touch node electrode, thereby decreasing the touch sensitivity of the touch sensor panel. In the example shown in FIG. 5B, shielding regions 510 and 512 together are disposed above traces 502, 504, 506, and 508, but not above touch node electrodes 501, 503, 505, and 507. This can top-shield the traces from noise (such as from coupling with a finger), while leaving the top surfaces of the touch node electrodes unshielded, to avoid decreasing touch sensitivity of the touch sensor panel. (Though not shown in FIG. 5B, additional shielding regions can analogously be provided above traces throughout touch sensor panel 500 to top-shield those traces.) In some examples, not shown in FIG. 5B, a selective shielding region (e.g., an "interrogated" electrode) may be disposed above touch node electrodes 501, 503, 505, and 507. In some such examples, the selective shielding region may be configured to selectively top-shield touch node electrodes 501, 503, 505, and 507 based on a touch sensing mode. For example, top-shielding such electrodes may be beneficial when operating in a self-capacitance touch sensing mode, but unnecessary or undesirable when operating in a mutual capacitance touch sensing mode.

Figure 6:
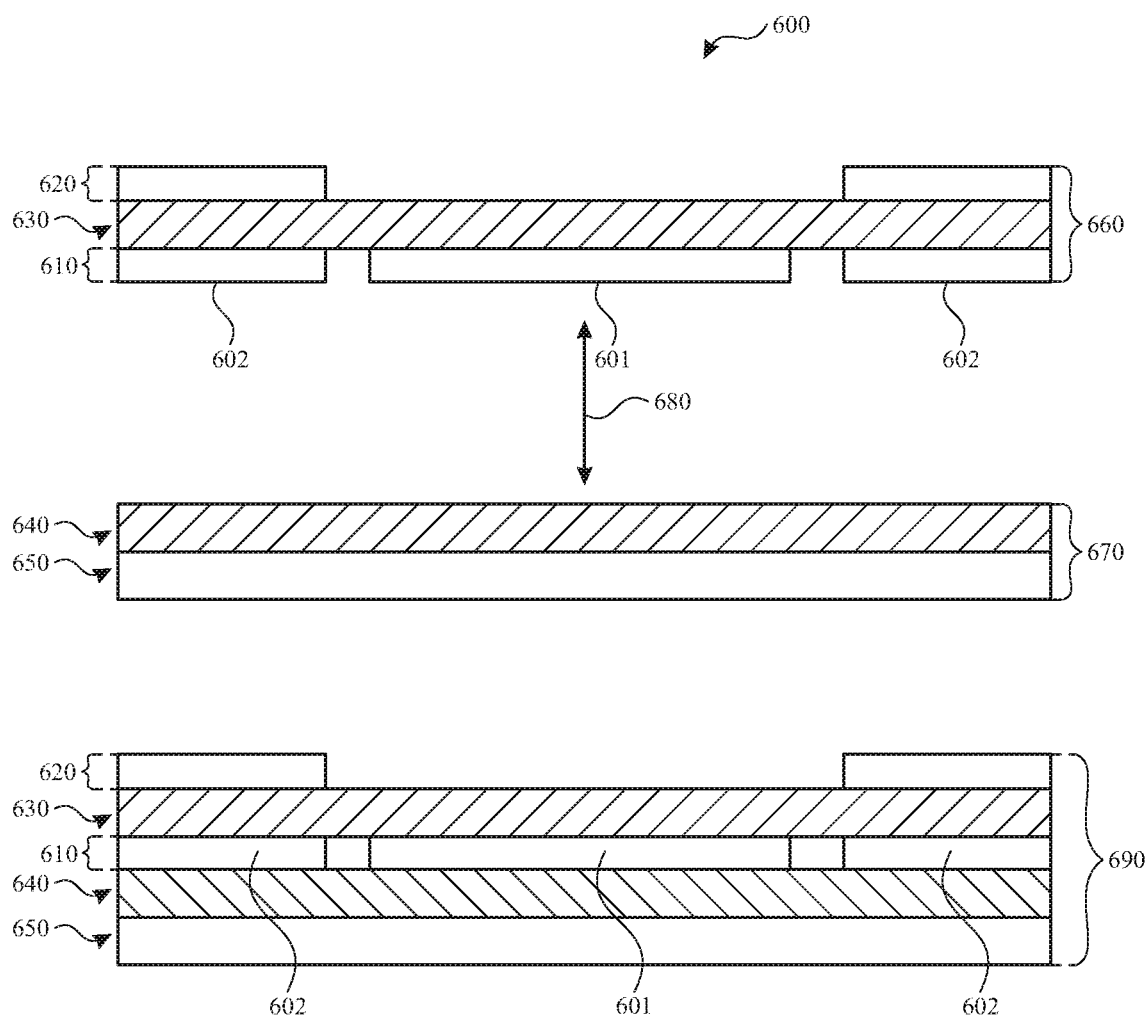
FIG. 6 illustrates example layers of an exemplary touch sensor panel with two substrate layers, a touch electrode layer disposed between the two substrate layers, a top shield electrode layer, and a bottom shield electrode layer, according to examples of the disclosure.

FIG. 6 shows selected layers from an example material stackup 690, corresponding to an example touch sensor panel 600, according to examples of the disclosure. (It should be noted that other components of the example stackup, such as bonding pads and/or passivation layers, are not shown in FIG. 6, to simplify the following explanation. However, it is understood that such components may be present.) In some touch sensor panels, such as example touch sensor panel 600, top and bottom shielding is provided using a material stackup that incorporates three electrode layers. The example shown in FIG. 6 includes a first substrate layer 630. As used herein, a substrate layer is a layer of a touch sensor panel that comprises one or more surfaces on which conductive or other material can be formed, and that has sufficient structural integrity to fully support itself as a freestanding structure (e.g., a structure that can substantially maintain its shape without needing structural support from the touch sensor panel or other material). Accordingly, the substrate layer can be relatively thick and rigid in comparison to the conductive or other material; and, in a touch sensor panel (e.g., touch sensor panel 600) example, the substrate layer provides structural support for layers of the panel (e.g., passivation layers, electrode layers) that lack the structural integrity to fully support themselves. In some examples, substrate layer 630 can include a flexible plastic material, such as cyclo olefin polymer (COP), although other materials are possible. Conductive material can be formed on a substrate layer using known patterning techniques, such as photolithography or etching.

In the example shown in FIG. 6, electrode layers 610 and 620 are formed on opposite sides of substrate layer 630. That is, first substrate layer 630 is disposed between two electrode layers: electrode layer 610 and electrode layer 620. In the example shown in FIG. 6, electrode layer 610 includes a touch node electrode 601 and one or more routing traces 602 to which the touch node electrode 601 is coupled. Electrode layer 610 can be formed on a surface (e.g., the bottom surface) of first substrate layer 630, and can comprise a conductive material, such as ITO. In the example shown in FIG. 6, a second electrode layer 620 is formed on the opposite surface (e.g., the top surface) of substrate layer 630. Like electrode layer 610, electrode layer 620 can comprise a conductive material. In the example shown in FIG. 6, in which electrode layer 620 is disposed above electrode layer 610, electrode layer 620 can provide top shielding for routing traces 602 in electrode layer 610. However, top shielding of all, or a significant portion of, touch node electrode 601 could be undesirable, as it could reduce the touch sensitivity of the touch sensor panel, as described in more detail below. In the example shown in FIG. 6, electrode layer 620 does not include material (such as conductive material) disposed above all of touch node electrode 601, and accordingly does not provide top shielding for all of touch node electrode 601. (In some examples (not shown in FIG. 6), electrode layer 620 may overlap a portion of touch node electrode 601.) The layers including electrode layers 610 and 620 and first substrate layer 630, with 610 and 620 disposed on opposite sides of 630, can be thought of as a dual-layer structure (shown as 660 in FIG. 6).

In the example shown in FIG. 6, the example stackup 690 includes a second substrate layer 640. Like substrate layer 630, substrate layer 640 is a base layer on which conductive material may be formed, and may comprise a flexible plastic material such as COP. In the example shown in FIG. 6, electrode layer 650 is formed on a single side (e.g., the bottom side) of substrate layer 640. Electrode layer 650, like electrode layers 610 and 620, can comprise a conductive material (e.g., ITO). If electrode layer 650 is disposed underneath electrode layer 610, 650 can provide bottom shielding for touch node electrode 601 and routing traces 602 in electrode layer 610. In the example shown in FIG. 6, substrate layer 640 has an electrode layer (650 in the figure) on only one side. The layers including electrode layer 650 and second substrate layer 640, with 650 disposed on a single side of 640 and no electrode layer on formed on the other side of 640, can be thought of as a single-layer structure (shown as 670 in FIG. 6).

In the example shown in FIG. 6, the double-layer structure 660 can be attached to the single-layer structure 670 via a lamination process 680. In the example shown in FIG. 6, the result of lamination process 680 can be material stackup 690, which includes two substrate layers (630 and 640) and three electrode layers (610, 620, and 650). In the example shown in FIG. 6, electrode layer 610 is disposed below electrode layer 620 (which can provide top shielding for routing traces 602 in electrode layer 610), and above electrode layer 650 (which can provide bottom shielding for touch node electrode 601 and routing traces 602 in electrode layer 610). In some examples in which touch sensor panel 600 is part of a touch screen, the touch sensor panel can be attached to the surface of a display (not shown). Touch node electrode 601 and routing traces 602 can be bottom-shielded from noise generated by the display by electrode layer 650.

As shown in FIG. 6, example stackup 690 includes two substrate layers, 630 and 640. Each substrate layer contributes to the overall thickness of the touch sensor panel. It may be desirable to reduce the thickness of a touch sensor panel, particularly when the touch sensor panel is part of a touch screen. For example, reducing the touch sensor panel thickness can improve the usability of a touch device by decreasing the distance between the panel surface and a display with which a user interacts via touch input. Reducing the touch sensor panel thickness can also enable touch-sensitive devices, such as those shown in FIG. 1, with thinner and/or more desirable form factors. Additionally, the use of two substrate layers in example stackup 690 can require a lamination process to join the substrate layers; this is shown in FIG. 6 by lamination process 680, which attaches dual-layer structure 660 to single-layer structure 670. This lamination process is potentially costly, may require the use of adhesives and other materials, and can add time and complexity to the process of fabricating touch sensor panel 600. Such a lamination process may not be necessary in touch sensor panels that utilize only a single substrate layer. It may thus be desirable to simplify this process by eliminating one of the two substrate layers in example stackup 690. At the same time, it may be desirable to retain the top and bottom shielding of example stackup 690. Additionally, in some examples, it may be desirable to make use of existing designs and fabrication processes, such as those that utilize a dual-layer structure, such as 660 in FIG. 6. This may be particularly true when substantial investment, such as by the touch sensor panel manufacturer or third parties, may have been made in those designs and fabrication processes. Some examples of the disclosure are directed to touch sensor panels that utilize a single substrate layer—and thus do not require laminating a dual-layer structure to a single-layer structure—while benefiting from top shielding and/or bottom shielding. Some examples of the disclosure are directed to touch sensor panels that utilize a polarizer in place of a standalone substrate layer, while benefiting from top shielding and/or bottom shielding.

Figure 7A:
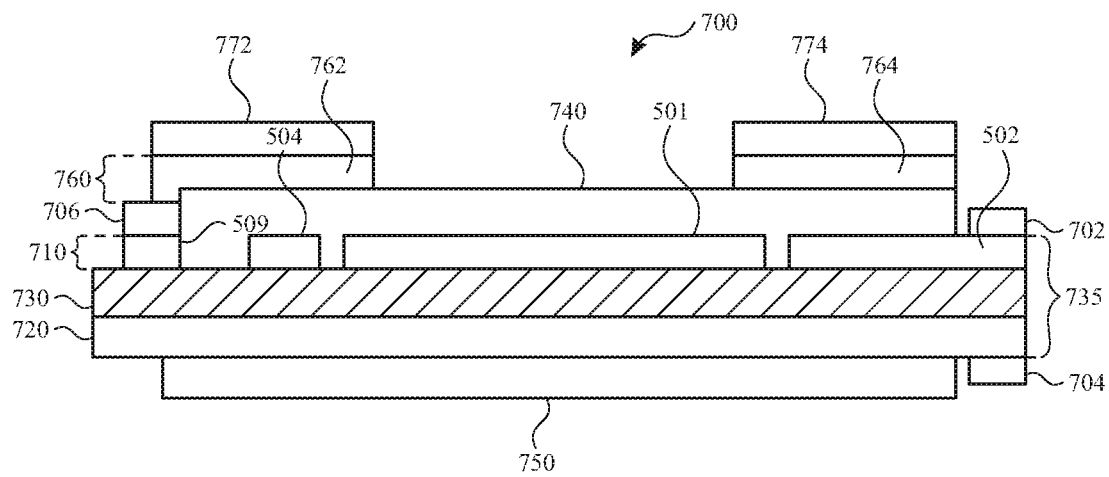

FIG. 7A illustrates an exemplary material stackup 700 of a touch sensor panel with a single substrate layer, a touch electrode layer disposed above the substrate layer, a top shield electrode layer, and a bottom shield electrode layer, depicted along cross-section A-A' in FIG. 5A, according to examples of the disclosure. FIG. 7A shows an electrode layer 710, an electrode layer 720, and a substrate layer 730 in a dual-layer configuration, such as described above with respect to dual-layer structure 660 in FIG. 6. In the example shown in FIG. 7A, electrode layer 710 is disposed above substrate layer 730, and electrode layer 720 is disposed below substrate layer 730 (e.g., electrode layer 710 and/or electrode layer 720 may be in contact with substrate layer 730 on opposite surfaces of substrate layer 730). Electrode layer 710 includes touch node electrode 501, and traces 502 and 504, as shown in FIGS. 5A-5B. Electrode layer 710 may also include bonding pad region 509 for connecting electrode layer 710 to circuitry. In the example shown in FIG. 7A, touch node electrode 501, traces 502 and 504, and bonding pad region 509 can be comprised of a conductive material (e.g., ITO), and may be formed by patterning a single layer of that material (e.g., using photolithography and etching techniques). It should be understood that, throughout the disclosure, a conductive material may be ITO, or another conductive material, such as nanowire materials or metal mesh materials. Further, it should be understood that conductive materials may be transparent. The examples of the disclosure are not limited to any particular conductive material.

Bonding pads, comprised of conductive material, can be used to connect electrode layers to circuitry (e.g., sense circuitry). In the example shown in FIG. 7A, trace 502 may include a bonding pad region electrically coupled to a first bonding pad 702 disposed above substrate 730 and trace 502 (e.g., bonding pad 702 may be in contact with trace 502), to connect trace 502 to first sense circuitry, such as shown in FIGS. 2, 3A, and/or 3B. (Trace 504 may be electrically coupled to second sense circuitry, which may be different from the first sense circuitry, via a bonding pad not shown in FIG. 7A.) It should be understood that, throughout the disclosure, bonding pads may be comprised of copper, or another conductive material. The examples of the disclosure are not limited to any particular bonding pad material.

In the example shown in FIG. 7A, electrode layer 720 can function as a bottom shield that provides noise shielding for touch node electrode 501 and traces 502 and 504 from noise sources located below electrode layer 720. This shielding may be beneficial, for example, to prevent interference from noise generated by circuitry, such as a display screen, located below the touch sensor panel. In the example shown, electrode layer 720 can be comprised of a conductive material (e.g., ITO), and may be formed by patterning a single layer of that material (e.g., using photolithography and etching techniques). Electrode layer 720 may include a bonding pad region electrically coupled to a second bonding pad 704, which can be disposed below substrate layer 730 and electrode layer 720 (e.g., bonding pad 704 may be in contact with electrode layer 720), to connect electrode layer 720 to first drive circuitry. The first drive circuitry may apply a guard signal, which may be an AC or DC voltage signal, to electrode layer 720. While FIG. 7A depicts bonding pad 702 and bonding pad 704 on opposite sides of substrate 730, the disclosure is not limited to such examples. For instance, bonding pad 702 and 704 could be electrically coupled (e.g., by one or more conductive vias) to a common surface disposed on a single side of substrate 730. Further, while FIG. 7A depicts electrode layer 710 and electrode layer 720 as coupled to bonding pad 702 and bonding pad 704, respectively, the disclosure is not limited to any particular relationship between electrode layers and bonding pads. For instance, a single electrode layer (e.g., electrode layer 710 or electrode layer 720) may comprise two or more electrodes, each such electrode connected to a different bond pad.

In the example shown in FIG. 7A, substrate layer 730, electrode layer 710 (which may be formed on one side of substrate layer 730), and electrode layer 720 (which may be formed on the opposite side of substrate layer 730) can be viewed as a dual-layer structure 735, analogous to the dual-layer structure 660 in FIG. 6. In some examples, passivation layers can be added above and below dual-layer structure 735, for example to protect dual-layer structure 735 from environmental hazards (e.g., scratching, moisture). In the example shown in FIG. 7A, a first passivation layer 740 may be disposed above dual-layer structure 735. That is, passivation layer 740 may be disposed above substrate layer 730, touch node electrode 501, and traces 502 and 504, such that touch node electrode 501 and traces 502 and 504 may be disposed between substrate layer 730 and passivation layer 740 (e.g., passivation layer 740 may be in contact with substrate layer 730, touch node electrode 501, and/or traces 502 and 504). Similarly, a second passivation layer 750 may be disposed below dual-layer structure 735. That is, passivation layer 750 may be disposed below electrode layer 720 (e.g., passivation layer 750 may be in contact with electrode layer 720, and electrode layer 720 may be disposed between substrate layer 730 and passivation layer 750).

In the example shown in FIG. 7A, the example stackup 700 includes a third electrode layer, shown in the figure as electrode layer 760. Unlike electrode layers 620 and 650 shown in FIG. 6, however, electrode layer 760 in example stackup 700 need not be formed on a surface of a substrate layer. Instead, electrode layer 760 can be formed above and on passivation layer 740, which in example stackup 700 is disposed above electrode layer 710 and substrate layer 730 (e.g., electrode layer 760 may be in contact with passivation layer 740, and electrode layers 760 and 710 are both disposed above substrate layer 730). In the example shown in FIG. 7A, electrode layer 760 includes shielding regions 762 and 764. Electrode layer 760 can function as a top shield that provides noise shielding for traces 502 and 504, which may be disposed directly below shielding regions 764 and 762, respectively, from noise sources (such as finger coupling) that may be located above electrode layer 760. Shielding regions 762 and 764 may be formed by patterning a single layer of conductive material (e.g., using photolithography and etching techniques). Electrode layer 760 may be comprised of nanowire materials, such as silver nanowire, although other conductive materials may be used. In the example shown, electrode layer 760 does not include material disposed directly above the touch node electrode 501 and thus may not provide top shielding for touch node electrode 501. This is because top shielding of touch node electrode 501 could dampen the touch sensor panel's ability to detect changes in capacitance, as by limiting the extent and/or flux of fringing electric fields extending above touch node electrode 501, with which an object, such as a user's finger, may capacitively interact.

In the examples of the disclosure, top and bottom shield electrode layers (e.g., electrode layers 760 and 720 in FIG. 7A) can be positioned completely or partially between one or more touch node electrodes (e.g., touch node electrode 501) in a touch electrode layer (e.g., touch electrode layer 710) and one or more noise sources, such as a display. This configuration (location of the shield layers between the touch electrodes and noise source) can provide a shielding effect by receiving capacitively coupled noise and shunting the charge away from the touch electrodes. The examples of the disclosure encompass various configurations in which such top and bottom shield electrode layers can shield a touch node electrode from noise. In some examples, one or both of the top and bottom shield electrode layers can be driven by a "guard" signal referenced to the stimulation signal of the touch electrodes. In such configurations, with the shield layers and the touch electrodes driven with signals referenced to each other (e.g., at the same frequency, phase and/or amplitude), parasitic capacitive coupling between the shield layers and the touch electrodes can be minimized, which further shields the touch electrodes from capacitively coupled noise. Similarly, while an "interrogated" touch electrode is being sensed to determine the occurrence of a touch, other "non-interrogated" touch electrodes can be driven with the same guard signal as the guard layer(s). In this configuration, the interrogated electrode can be surrounded by other touch electrodes that are also acting as a shield. As each electrode is interrogated in turn, the guard signal can be selectively applied to other non-interrogated electrodes. In other examples, one or both of the top and bottom shield electrodes can be held at earth ground. In some examples, depending on the touch sensing mode (e.g., self-capacitance sensing, mutual capacitance sensing), a guard signal may be of limited benefit, and accordingly may not be applied to one or more electrode layers. It should be understood throughout the examples of the disclosure that, where shielding behavior of an electrode layer is described, the examples are not limited to any particular mechanism (e.g., passive shielding, active shielding using a guard signal) by which the electrode layer exhibits such shielding behavior.

In the example shown in FIG. 7A, the example stackup 700 includes passivation regions 772 and 774 disposed above shielding regions 762 and 764, respectively (e.g., passivation region 772 may be in contact with shielding region 762, and/or passivation region 774 may be in contact with shielding region 764; shielding region 762 may be disposed between passivation layer 740 and passivation region 772; and shielding region 764 may be disposed between passivation layer 740 and passivation region 774). Passivation regions 772 and 774 provide environmental protection for shielding regions 764 and 762 and the underlying circuitry. In examples in which electrode layer 760 includes nanowire materials, such as silver nanowire, only thin passivation regions 772 and 774 may be required. In some examples, electrode layer 760 may include a material combining nanowire materials with a passivation material, simplifying the process of forming passivation regions 772 and 774 above electrode layer 760. In some examples, passivation regions 772 and 774 can be omitted from stackup 700.

In the example shown in FIG. 7A, electrode layer 710 includes bonding pad region 509, which may be electrically coupled to a third bonding pad 706, which may be disposed above substrate layer 730 and electrode layer 710 (e.g., bonding pad 706 may be in contact with electrode layer 710 via bonding pad region 509). Shielding regions 762 and 764 may be electrically coupled to bonding pad 706 to connect to second drive circuitry. The second drive circuitry may apply a guard signal, which may be an AC or DC voltage signal, to shielding regions 762 and 764. (The second drive circuitry may be, but need not be, the same as the first drive circuitry.) In the example shown in FIG. 7A, bonding pad 706 may be formed from the same layer, and in the same step of a fabrication process, as bonding pad 702. While FIG. 7A depicts bonding pad 702 and bonding pad 706 as positioned on opposing sides of touch node electrode 501 (e.g., on opposing sides of a touch sensor panel), in some examples, bonding pad 702 and bonding pad 706 may be positioned on a common side (e.g., the leftmost edge of touch sensor panel 500 shown in FIG. 5).

Figure 7B:
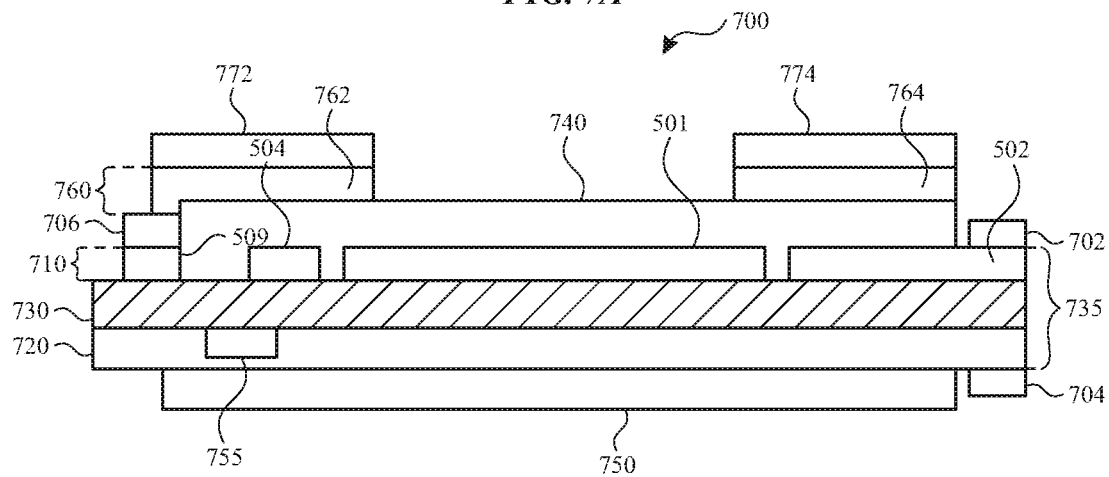
Figure 7C:
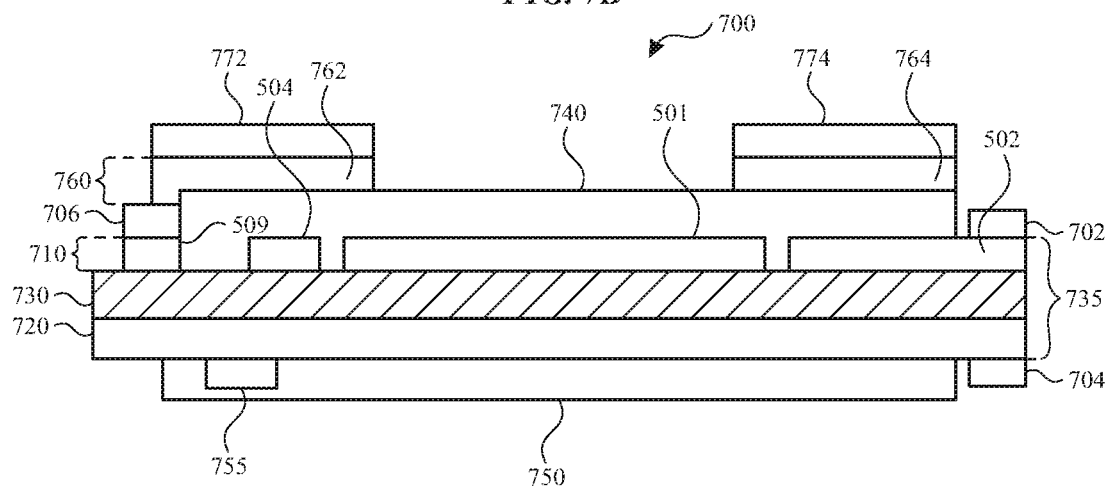

FIGS. 7B and 7C show further examples of stackup 700 that include a conductive line 755 to reduce the effective sheet resistance of electrode layer 720, such as described above with respect to conductive line 520 shown in FIG. 5A. In some examples of stackup 700 that include a conductive line 755, such as shown in FIG. 7B, conductive line 755 may be disposed below substrate layer 730 (e.g., conductive line 755 may be in contact with substrate layer 730). Electrode layer 720 may be formed on the bottom surfaces of substrate layer 730 and conductive line 755 (e.g., electrode layer 720 may be in contact with substrate layer 730 and/or conductive line 755, and conductive line 755 may be embedded in electrode layer 720). In some examples, such as shown in FIG. 7C, conductive line 755 may be disposed below electrode layer 720 (e.g., conductive line 755 may be in contact with electrode layer 720, and need not be in direct contact with substrate layer 730). Passivation layer 750 may be formed on the bottom surfaces of electrode layer 720 and conductive line 755 (e.g., passivation layer 750 may be in contact with electrode layer 720 and/or conductive line 755, and conductive line 755 may be embedded in passivation layer 750). In the examples of both FIGS. 7B and 7C, the inclusion and electrical coupling of conductive line 755 to electrode layer 720 can lower the overall sheet resistance of electrode layer 720, allowing for better shielding performance when electrode layer 720 is acting as a noise shield, and potentially allowing stackup 700 to scale to larger panel sizes more easily than stackups that do not include the conductive line.

Example stackup 700 may provide several advantages over example stackup 690 shown in FIG. 6. In example stackup 690, electrode layer 610 (which includes traces 602) can be top-shielded from noise by electrode layer 620, where electrode layer 610 and electrode layer 620 are on opposite sides of a substrate layer (substrate layer 630) in a dual-layer structure. However, in stackup 700, top shielding of electrode layer 710 (which includes traces 502 and 504) can instead be provided by electrode layer 760. Unlike in example stackup 690, electrode layer 710 and electrode layer 760 are not separated by a substrate layer in a dual-layer structure. Instead, electrode layer 710 and electrode layer 760 are both disposed on the same side of substrate layer 730, with electrode layer 760 formed on passivation layer 740 instead of on a second substrate layer. That is, example stackup 700 does not include a second substrate layer between substrate layer 730 and electrode layer 760. Compared to example stackup 690, the configuration of example stackup 700 eliminates one substrate layer (e.g., substrate layer 630 in FIG. 6), potentially eliminating the touch sensor panel thickness associated with that substrate layer. Additionally, no lamination process is required to laminate a dual-layer structure (such as 660 in FIG. 6) to a single-layer structure (such as 670 in FIG. 6); removing this lamination process can potentially reduce the cost and complexity of fabrication, and the costs and stackup thickness associated with materials (such as adhesive materials) that might otherwise be required for lamination. Additionally, in example stackup 700, one or more bonding pads (e.g., bonding pads 702 and 706) can be formed from a single layer of conductive material on the same side of substrate layer 730. This can simplify the cost and complexity of fabrication compared to examples, such as the example shown in FIG. 6, in which bonding pads may be formed from multiple layers of conductive material on opposite sides of a substrate layer. (For instance, in the example shown in FIG. 6, electrode layers 610, 620, and 650 may connect to bonding pads formed from three separate layers, each layer separated from the other layers by substrate layers 630 and/or 640.) Meanwhile, shielding of touch node electrode 501 and traces 502 and 504 need not be compromised by the elimination of a substrate layer, as electrode layer 710 (e.g., touch node electrode 501 and traces 502 and 504) can be shielded in the example from both the top and the bottom, similarly to electrode layer 610 in FIG. 6.

In some examples, such as shown in FIGS. 7A-7C, electrode layer 760 can be comprised of nanowire materials, such as silver nanowire. An advantage that can be conveyed by nanowire materials is that they can exhibit improved mechanical flexibility over some other conductive materials (e.g., ITO), potentially allowing example 700 to be more structurally robust than stackups such as example 690 in FIG. 6. Further, nanowire materials may exhibit lower sheet resistance than some other conductive materials. Similarly, in examples that include a conductive line coupled to an electrode layer, such as described above with respect to FIGS. 7B and 7C, that conductive line may contribute to lower sheet resistance. This lower sheet resistance can allow for more effective shielding and better touch sensor performance, and may allow example 700 to scale to larger panel sizes more easily than example 690.

Figures 1, 7D:
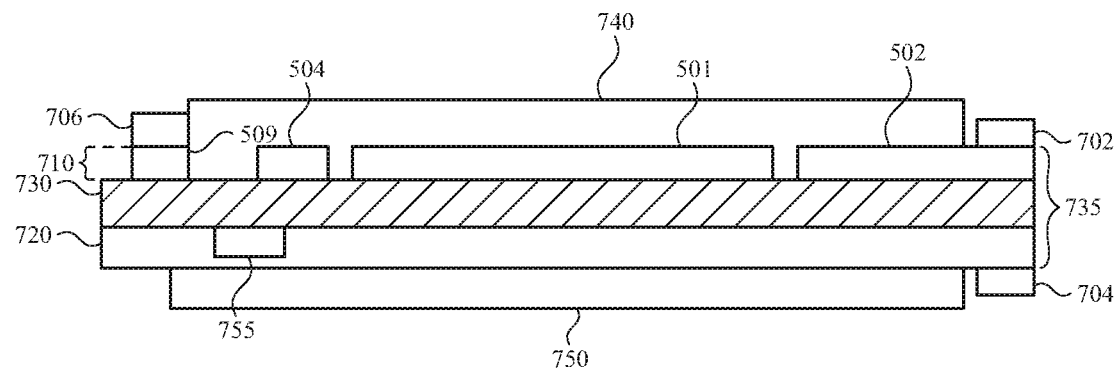
Figures 2, 7D:
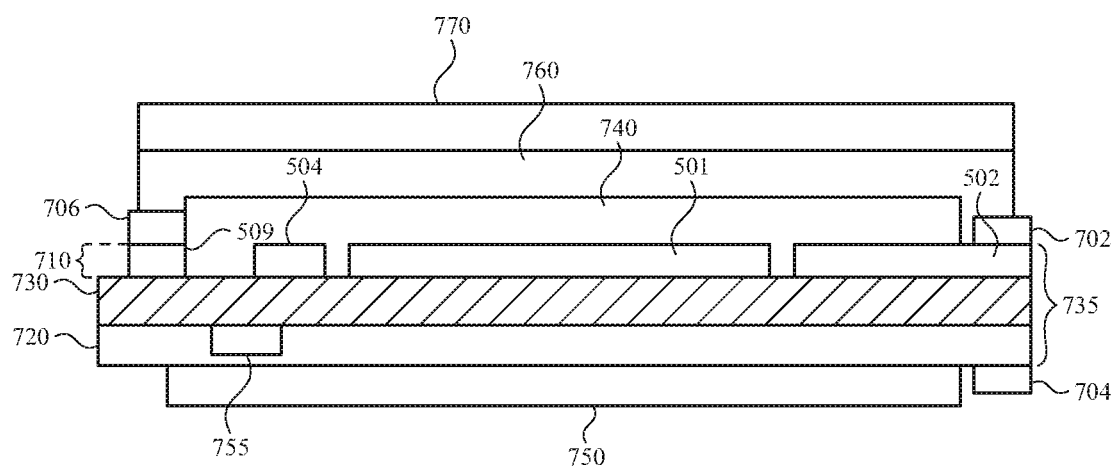
Figures 3, 7D:
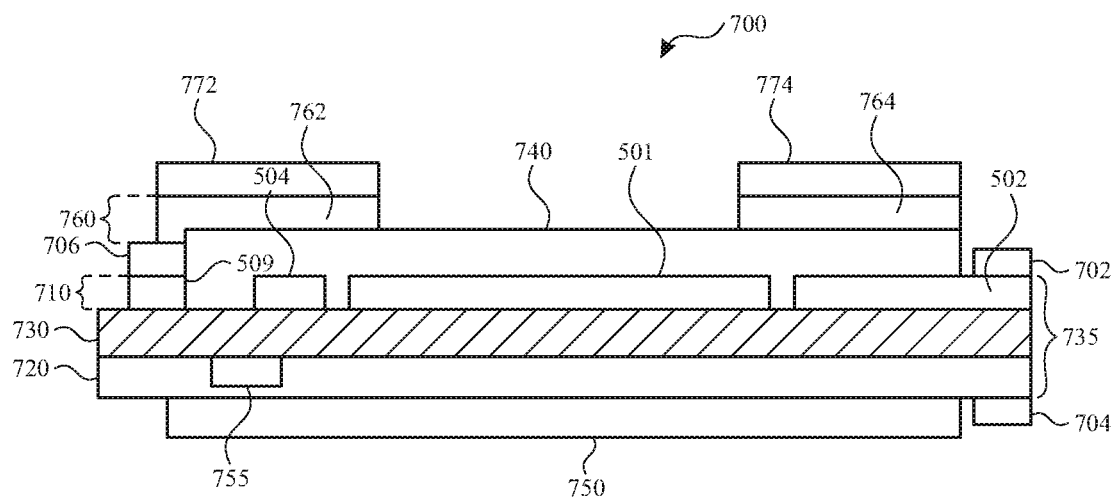

FIGS. 7D-1 through 7D-3 illustrate an example process for forming exemplary material stackup 700, as shown in FIG. 7B. Electrode layers 710, 720, and 760, substrate layer 730, passivation layers 740 and 750, bonding pads 702, 704, and 706, electrode layer 760 (e.g., shielding regions 762 and 764), passivation regions 772 and 774, and conductive line 755 are as shown in FIG. 7B. FIG. 7D-1 shows stackup 700 after a standard annealing process, the result of which may include a dual-layer structure 735 such as shown in FIG. 7B—electrode layers 710 and 720 formed on opposite sides of substrate layer 730—with passivation layers 740 and 750 on the top and bottom sides, respectively, of dual-layer structure 735. In FIG. 7D-1, shielding regions 762 and 764 and passivation regions 772 and 774 (shown in FIG. 7B) have not yet been formed.

FIG. 7D-2 shows electrode layer 760 formed above passivation layer 740 of stackup 700 via a lamination process (e.g., passivation layer 740 may be in contact with electrode layer 760), and passivation layer 770 formed above electrode layer 760 (e.g., passivation layer 770 may be in contact with electrode layer 760). In examples in which electrode layer 760 includes nanowire materials, such as silver nanowire, only a thin passivation layer 770 may be required. In some examples, electrode layer 760 may include a material combining nanowire materials with a passivation material, simplifying the process of forming passivation layer 770 above electrode layer 760. Example stackup 700 can then be subjected to an exposure and development process, which can remove portions of electrode layer 760 and passivation layer 770 disposed above touch node electrode 501 and bonding pad 702, while leaving portions of electrode layer 760 and passivation layer 770 disposed above traces 502 and 504. As described above, this may provide top shielding of traces 502 and 504, which may be desirable, while avoiding top shielding of touch node electrode 501, which may not be desirable. Moreover, this can prevent electrode layer 760 from being electrically coupled to bonding pad 702 (which may be coupled to trace 502). This exposure and development process can result in shielding regions 762 and 764 and passivation regions 772 and 774. A result of this exposure and development process is the example stackup 700 as shown in FIG. 7B (reproduced as FIG. 7D-3 for clarity). Other processes can additionally or alternatively be used to form example stackup 700.

Figure 8A:
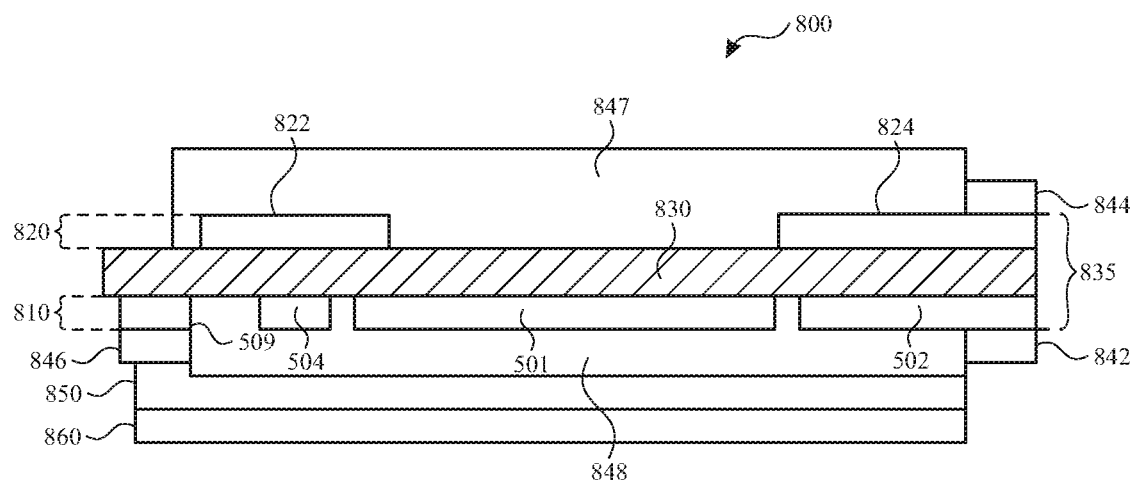

FIG. 8A illustrates an exemplary material stackup 800 of a touch sensor panel with a single substrate layer, a touch electrode layer disposed below the substrate layer, a top shield electrode layer, and a bottom shield electrode layer, depicted along cross-section A-A' in FIG. 5A, according to examples of the disclosure. FIG. 8A shows an electrode layer 810, an electrode layer 820, and a substrate layer 830 in a dual-layer configuration, such as described above with respect to dual-layer structure 660 in FIG. 6. In the example shown in FIG. 8A, electrode layer 810 is disposed below substrate layer 830, and electrode layer 820 is disposed above substrate layer 830 (e.g., electrode layer 810 and/or electrode layer 820 may be in contact with substrate layer 830 on opposite surfaces of substrate layer 830). Electrode layer 810 includes touch node electrode 501, and traces 502 and 504, as shown in FIGS. 5A-5B. Electrode layer 810 may also include bonding pad region 509 for connecting to circuitry. In the example shown in FIG. 8A, touch node electrode 501, traces 502 and 504, and bonding pad region 509 can be comprised of a conductive material, and may be formed by patterning a single layer of that material (e.g., using photolithography and etching techniques). Trace 502 may include a bonding pad region electrically coupled to a first bonding pad 842 disposed below substrate 830 and trace 502 (e.g., bonding pad 842 may be in contact with trace 502), to connect trace 502 to first sense circuitry, such as shown in FIGS. 2, 3A, and/or 3B. (Trace 504 may be electrically coupled to second sense circuitry, which may be different from the first sense circuitry, via a bonding pad not shown in FIG. 8A.)

In the example shown in FIG. 8A, electrode layer 820 can function as a top shield that provides noise shielding for traces 502 and 504 from noise sources located above electrode layer 820. This shielding may be beneficial, for example, to protect the traces from interference from noise generated from above the touch sensor panel, such as from the contact environment. In the example shown, electrode layer 820 includes shielding regions 822 and 824, which may be comprised of a conductive material (e.g., ITO), and may be formed by patterning a single layer of that material (e.g., using photolithography and etching techniques). In FIG. 8A, shielding regions 822 and 824 may be disposed directly above traces 504 and 502, respectively, and provide top shielding for those respective traces. Shielding regions 822 and 824 may correspond to shielding regions 510 and 512 in FIG. 5B, which can similarly provide top shielding for traces 504 and 502. In the example shown, electrode layer 820 does not include material disposed directly above the touch node electrode 501 and thus may not provide top shielding for touch node electrode 501. This is because top shielding of touch node electrode 501 could dampen the touch sensor panel's ability to detect changes in capacitance, as by limiting the extent and/or flux of fringing electric fields, extending above touch node electrode 501, with which an object, such as a user's finger, may capacitively interact.

In some examples, shielding region 824 may include a bonding pad region electrically coupled to a second bonding pad 844, which may be disposed above substrate layer 830 and shielding region 824 (e.g., bonding pad 844 may be in contact with shielding region 824), to connect electrode layer 820 (e.g., shielding regions 822 and/or 824) to first drive circuitry. The first drive circuitry may apply a guard signal, which may be an AC or DC voltage signal, to shielding region 824 (and, via conductive material not shown in FIG. 8A, to shielding region 822).

In the example shown in FIG. 8A, substrate layer 830, electrode layer 810 (which may be formed on one side of substrate layer 830), and electrode layer 820 (which may be formed on the opposite side of substrate layer 830) can be viewed as a dual-layer structure 835, analogous to the dual-layer structure 660 in FIG. 6. In some examples, passivation layers can be added above and below dual-layer structure 835, for example to protect dual-layer structure 835 from environmental hazards (e.g., scratching, moisture). In the example shown in FIG. 8A, a first passivation layer 847 may be disposed above dual-layer structure 835. That is, passivation layer 847 may be disposed above substrate layer 830 and electrode layer 820 (e.g., passivation layer 847 may be in contact with substrate layer 830 and/or shielding regions 822 and 824). Similarly, a second passivation layer 848 may be disposed below dual-layer structure 835. That is, passivation layer 848 may be disposed below substrate layer 830, touch node electrode 501, and traces 502 and 504, such that touch node electrode 501 and traces 502 and 504 may be disposed between substrate layer 830 and passivation layer 848 (e.g., passivation layer 848 may be in contact with substrate layer 830, touch node electrode 501, and/or traces 502 and 504).

In the example shown in FIG. 8A, the example stackup 800 includes a third electrode layer, shown in the figure as electrode layer 850. Unlike electrode layers 620 and 650 shown in FIG. 6, however, electrode layer 850 in example stackup 800 need not be formed on a surface of a substrate layer. Instead, electrode layer 850 can be formed below and on passivation layer 848, which in example stackup 800 is disposed below electrode layer 810 and substrate layer 830 (e.g., electrode layer 850 may be in contact with passivation layer 848, and electrode layers 850 and 810 are both disposed below substrate layer 830). In the example shown in FIG. 8A, electrode layer 850 can function as a bottom shield that provides noise shielding for touch node electrode 501 and traces 502 and 504, which may be disposed directly above electrode layer 850, from noise sources (such as a display) that may be located below electrode layer 850. Electrode layer 850 may be formed by patterning a single layer of conductive material. Electrode layer 850 may be comprised of nanowire materials, such as silver nanowire, although other conductive materials may be used.

In the example shown in FIG. 8A, the example stackup 800 includes a passivation layer 860 disposed below electrode layer 850 (e.g., passivation layer 860 may be in contact with electrode layer 850). Passivation layer 860 can provide environmental protection for electrode layer 850 and the underlying circuitry. In the example shown in FIG. 8A, electrode layer 810 includes bonding pad region 509, which may be electrically coupled to a third bonding pad 846, which may be disposed below substrate layer 830 and electrode layer 810 (e.g., bonding pad 846 may be in contact with region 509 of electrode layer 810). Electrode layer 850 may be electrically coupled to bonding pad 846 to connect to second drive circuitry. The second drive circuitry may apply a guard signal, which may be an AC or DC voltage signal, to electrode layer 850. (The second drive circuitry may be, but need not be, the same as the first drive circuitry.) In the example shown in FIG. 8A, bonding pad 846 may be formed from the same layer, and in the same step of a fabrication process, as bonding pad 842.

Figure 8B:
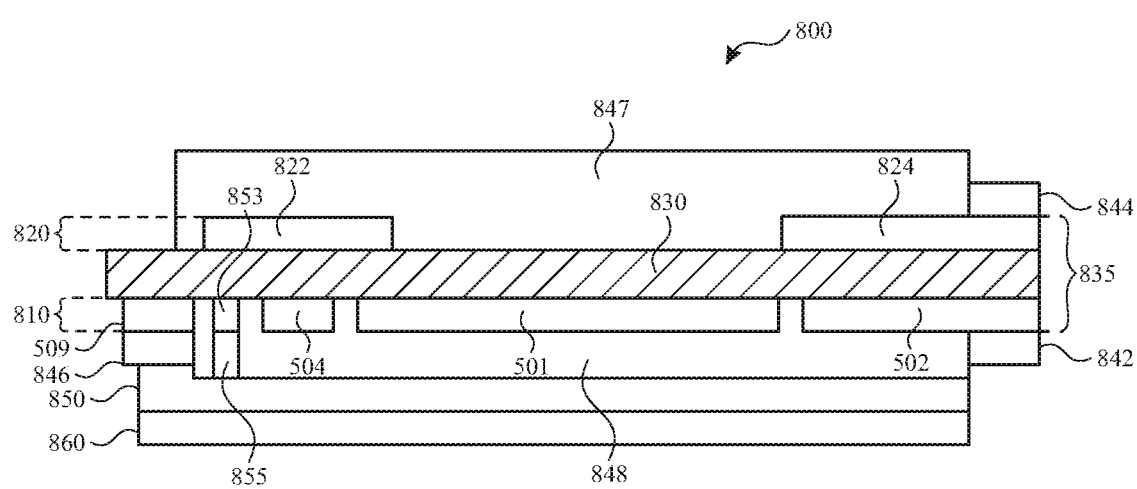
Figure 8C:
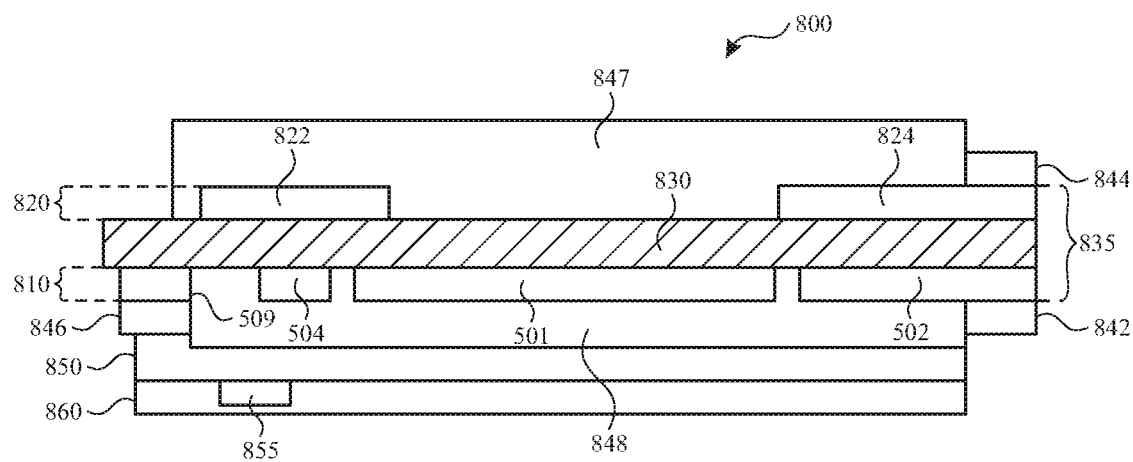

FIGS. 8B and 8C show further examples of stackup 800 that include a conductive line 855 to reduce the effective sheet resistance of electrode layer 850, such as described above with respect to FIG. 5A (and below with reference to FIGS. 8E and 8F). In some examples of stackup 800 that include a conductive line 855, such as shown in FIG. 8B, conductive line 855 may be disposed below substrate layer 830 and electrode layer 810 (e.g., conductive line 855 may be in contact with substrate layer 830 and/or electrode layer 810). Conductive line 855 can be formed in the same layer as a bonding pad (e.g., bonding pad 842), from the same material as the bonding pad, and may be coupled to a region 853 in electrode layer 810. Region 853 may not be electrically connected to other regions of electrode layer 810 (e.g., touch node electrode 501, traces 502 and 504, and bonding pad region 509). Electrode layer 850 may be formed on the bottom surfaces of passivation layer 848 and conductive line 855 (e.g., electrode layer 850 may be in contact with passivation layer 848 and/or conductive line 855). In some examples, such as shown in FIG. 8C, conductive line 855 may be disposed below electrode layer 850 (e.g., conductive line 855 may be in contact with electrode layer 850). Passivation layer 860 may be formed on the bottom surfaces of electrode layer 850 and conductive line 855 (e.g., passivation layer 860 may be in contact with electrode layer 850 and/or conductive line 855, and conductive line 855 may be embedded in passivation layer 850). In the examples of both FIGS. 8B and 8C, the inclusion and electrical coupling of conductive line 855 to electrode layer 850 can lower the overall sheet resistance of electrode layer 850, allowing for better touch sensor performance, and potentially allowing example 800 to scale to larger panel sizes more easily than examples that do not include the conductive line.

Example stackup 800 may provide several advantages over example stackup 690 shown in FIG. 6. In example stackup 690, electrode layer 610 (which includes touch node electrode 601 and traces 602) can be bottom-shielded from noise by electrode layer 650, where electrode layer 610 and electrode layer 650 are on opposite sides of a substrate layer (substrate layer 640) in a dual-layer structure. However, in stackup 800, bottom shielding of electrode layer 810 (which includes touch node electrode 501 and traces 502 and 504) can instead be provided by electrode layer 850. Unlike in example stackup 690, electrode layer 810 and electrode layer 850 are not separated by a substrate layer in a dual-layer structure. Instead, electrode layer 810 and electrode layer 850 are both disposed on the same side of substrate layer 830, with electrode layer 850 formed on passivation layer 848 instead of on a second substrate layer. That is, example stackup 800 does not include a second substrate layer between substrate layer 830 and electrode layer 850. Compared to example stackup 690, the configuration of example stackup 800 eliminates one substrate layer (e.g., substrate layer 640 in FIG. 6), potentially eliminating the touch sensor panel thickness associated with that substrate layer. Additionally, no lamination process is required to laminate a dual-layer structure (such as 660 in FIG. 6) to a single-layer structure (such as 670 in FIG. 6); removing this lamination process can potentially reduce the cost and complexity of fabrication, and the costs and stackup thickness associated with materials (such as adhesive materials) that might otherwise be required. Additionally, in example stackup 800, one or more bonding pads (e.g., bonding pads 842 and 846) can be formed from a single layer of conductive material on the same side of substrate layer 830. This can simplify the cost and complexity of fabrication compared to examples, such as the example shown in FIG. 6, in which bonding pads may be formed from multiple layers of conductive material on opposite sides of a substrate layer. (For instance, in the example shown in FIG. 6, electrode layers 610, 620, and 650 may connect to bonding pads formed from three separate layers, each layer separated from the other layers by substrate layers 630 and/or 640.) Meanwhile, shielding of touch node electrode 501 and traces 502 and 504 need not be compromised by the elimination of a substrate layer, as electrode layer 810 (which includes touch node electrode 501 and traces 502 and 504) is shielded in the example from both the top and the bottom, similar to electrode layer 610 in FIG. 6.

In some examples, such as shown in FIGS. 8A-8C, electrode layer 850 can be comprised of nanowire materials, such as silver nanowire. An advantage that can be conveyed by nanowire materials is that they can exhibit improved mechanical flexibility over some other conductive materials (e.g., ITO), potentially allowing example 800 to be more structurally robust than example 690 in FIG. 6. Further, nanowire materials may exhibit lower sheet resistance than some other conductive materials. Similarly, in examples that include a conductive line coupled to an electrode layer, such as described above and shown in FIGS. 8B and 8C, that conductive line may contribute to lower sheet resistance of the electrode layer. This lower sheet resistance can allow for more effective shielding and better touch sensor performance, and may allow example 800 to scale to larger panel sizes more easily than example 690.

Figures 1, 8D:
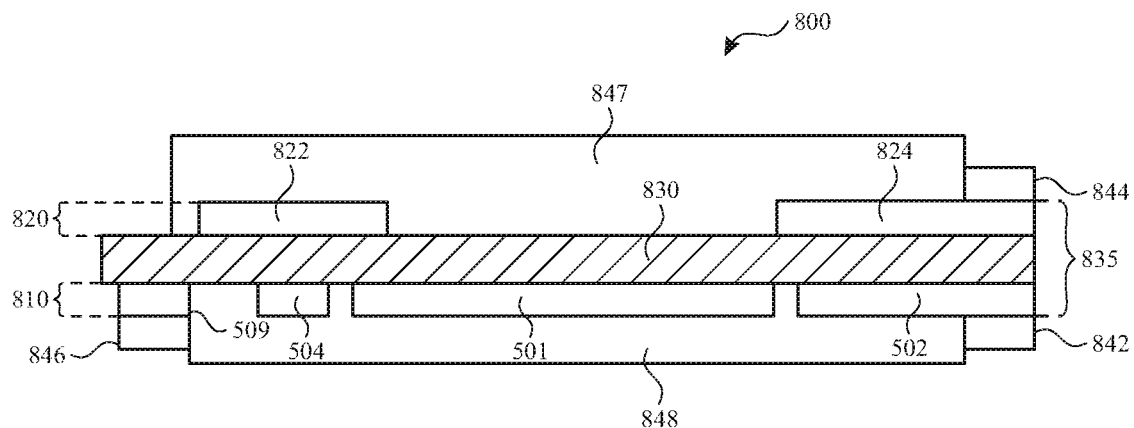
Figures 2, 8D:
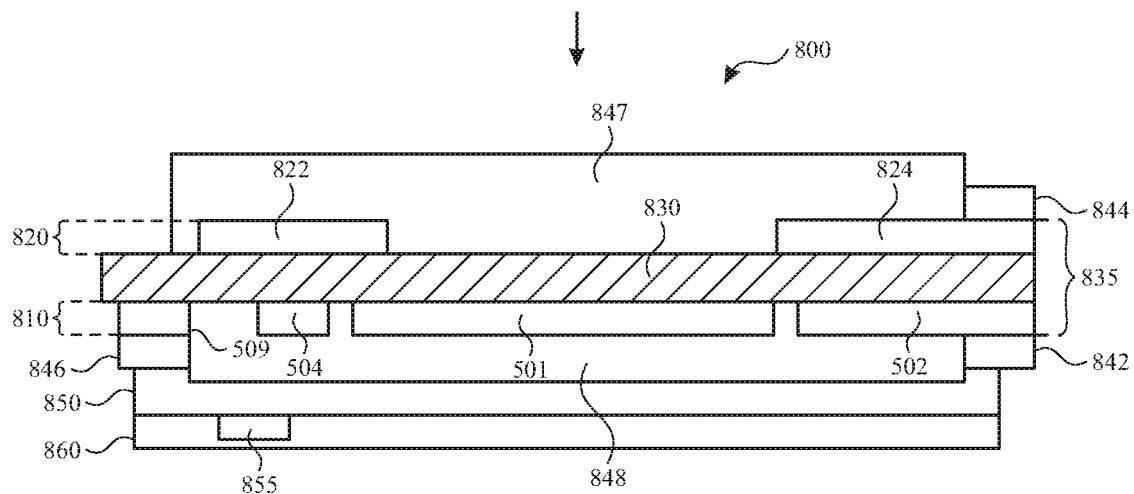
Figures 3, 8D:
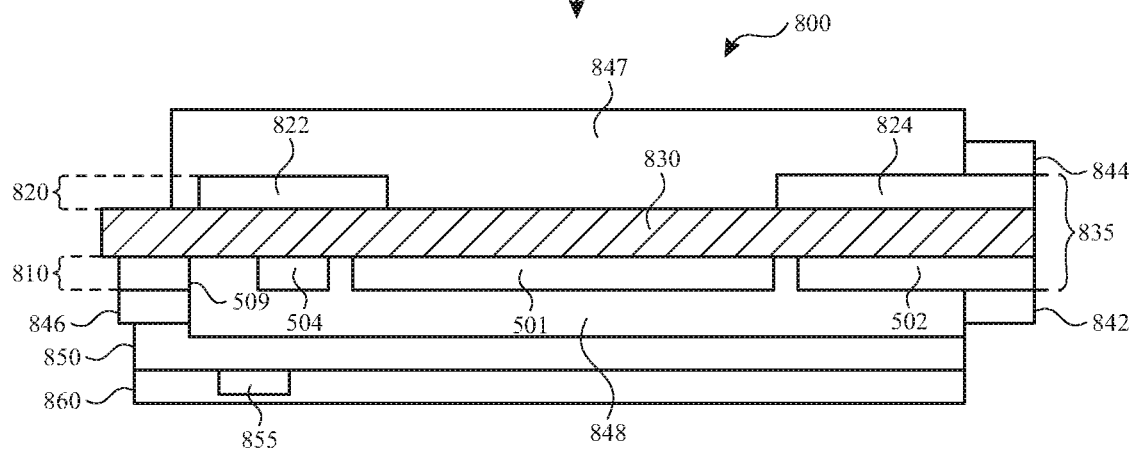

FIGS. 8D-1 through 8D-3 illustrate an example process for forming exemplary material stackup 800, as shown in FIG. 8C. Electrode layers 810, 820 (e.g., shielding regions 822 and 824), and 850, substrate layer 830, passivation layers 847, 848, and 860, bonding pads 842, 844, and 846, and conductive line 855 are as shown in FIG. 8C. FIG. 8D-1 shows stackup 800 after a standard annealing process, the result of which may include a dual-layer structure 835 as shown in FIG. 8C—electrode layers 810 and 820 formed on opposite sides of substrate layer 830—with passivation layers 847 and 848 on the top and bottom sides, respectively, of dual-layer structure 835. In FIG. 8D-1, electrode layer 850 and passivation layer 860 (shown in FIG. 8C) have not yet been formed.

FIG. 8D-2 shows electrode layer 850 formed below passivation layer 848 of stackup 800 via a lamination process (e.g., passivation layer 848 may be in contact with electrode layer 850), and passivation layer 860 formed below electrode layer 850 (e.g., passivation layer 860 may be in contact with electrode layer 850). In some examples that include a conductive line 855, such as shown in FIG. 8C, conductive line 855 may be disposed under electrode layer 850 and embedded in passivation layer 860. In examples in which electrode layer 850 includes nanowire materials, such as silver nanowire, only a thin passivation layer 860 may be required. In some examples, electrode layer 850 may include a material combining nanowire materials with a passivation material, simplifying the process of forming passivation layer 860 below electrode layer 850. Example stackup 800 can then be subjected to an exposure and development process, which can remove unwanted or unnecessary portions of electrode layer 850 and passivation layer 860. For example, this can prevent electrode layer 850 from being electrically coupled to bonding pad 842 (which may be coupled to trace 502). The remaining portions of electrode layer 850, as shown in FIG. 8D-3, can provide bottom shielding for electrode layer 810. A result of this exposure and development process is the example stackup 800 as shown in FIG. 8C (reproduced as FIG. 8D-3 for clarity). Other processes can additionally or alternatively be used to form example stackup 800.

Figure 8E:
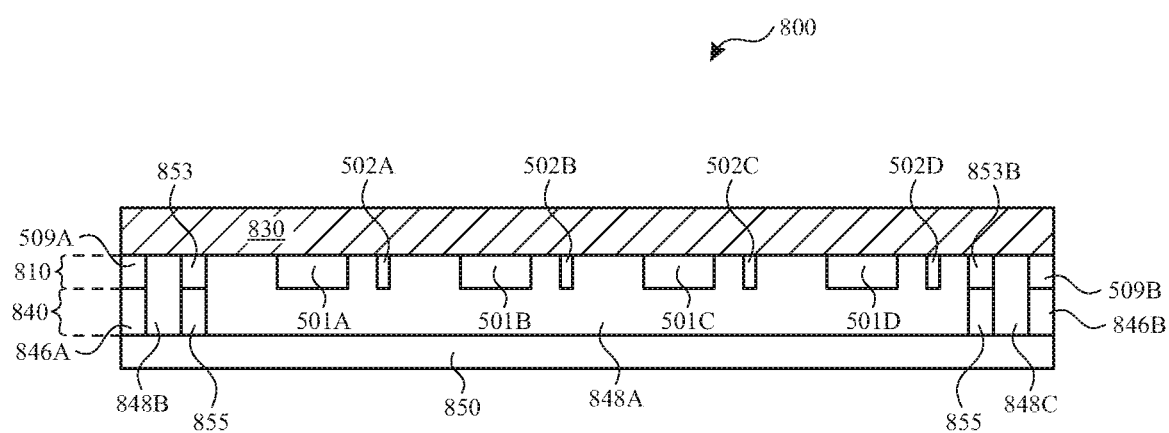
Figure 8F:
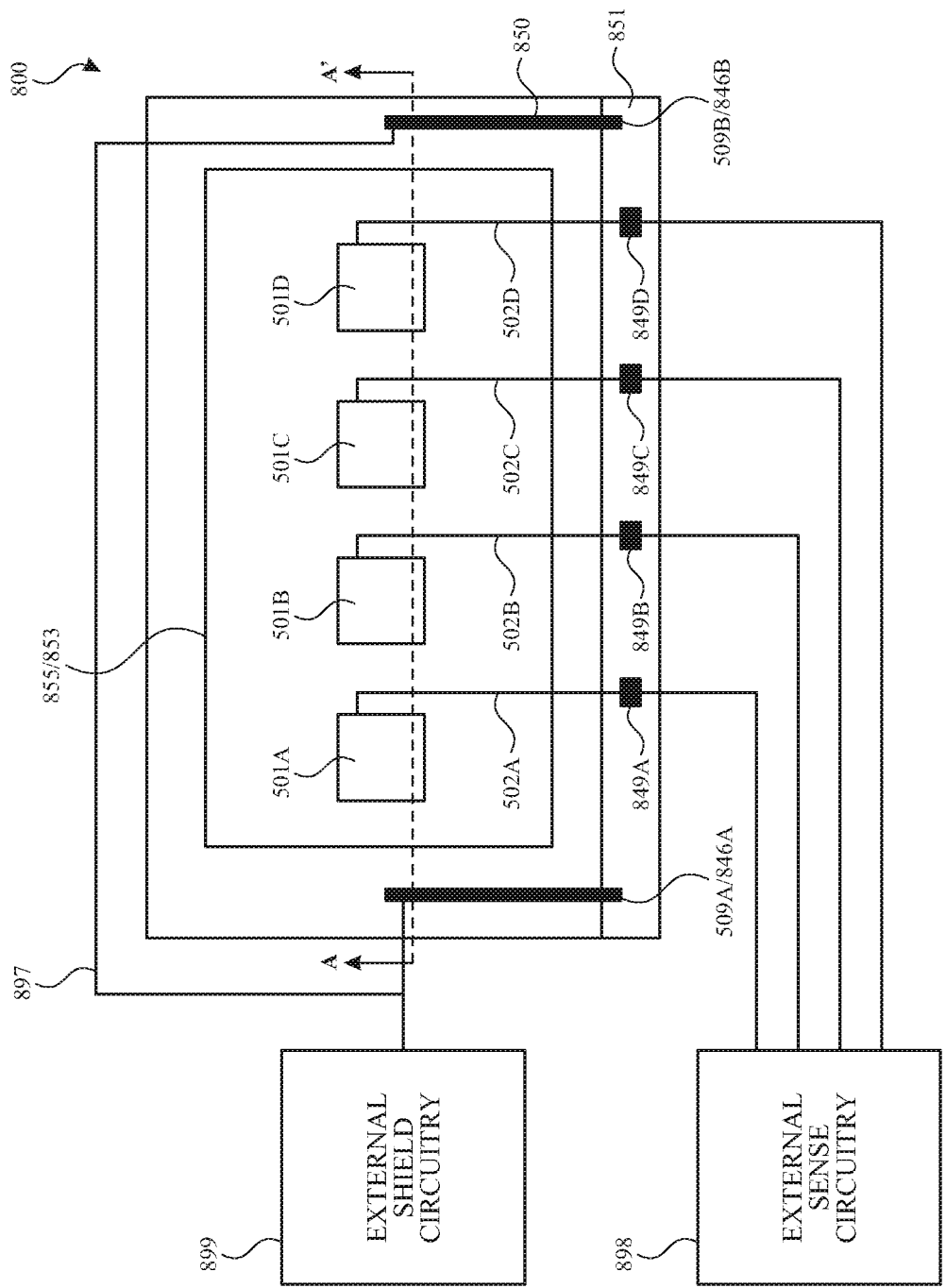

FIGS. 8E and 8F show an expanded view of an example stackup 800, as shown in FIG. 8B, according to examples of the disclosure. FIG. 8E shows a horizontal cross section A-A' of a touch sensor panel shown in FIG. 8F, the cross section extending from the left edge of the touch sensor panel to the right edge of the touch sensor panel and intersecting a row of touch node electrodes 501A through 501D. FIG. 8F shows a partial top view of the touch sensor panel. In the example shown in FIGS. 8E and 8F, as in FIG. 8B, electrode layer 810 is formed on the bottom surface of substrate layer 830. Electrode layer 810 can include touch node electrodes 501A through 501D, routing traces 502A through 502D, bonding pad regions 509A and 509B, and electrode layer regions 853. In the example shown in FIGS. 8E and 8F, touch node electrodes 501A through 501D can be coupled to external sense circuitry 898 via traces 502A through 502D and bonding pads 849A-849D. In the example shown in FIGS. 8E and 8F, as in FIG. 8B, electrode layer 850 is disposed below electrode layer 810 and can provide bottom shielding for electrode layer 810. As visible in FIG. 8F, electrode layer 850 may not extend to the edges of the touch sensor panel; a touch sensor panel region 851 may extend beyond electrode layer 850 and allow for connections to electrode layer 810 (e.g., connections of lines from sense circuitry 898 to traces 502A-502D at bonding pads 849A-849D). In the example shown in FIGS. 8E and 8F, electrode layer 850 can be connected to external shield circuitry 899 via trace 897 at bonding pads 846A and 846B, which can be coupled to bonding pad regions 509A and 509B, respectively, in electrode layer 810.

In the example shown in FIGS. 8E and 8F, electrode layer 850 can be coupled to a conductive line 855, which may have lower resistance than electrode layer 850, and which may correspond to conductive line 520 shown in FIG. 5A. Conductive line 855 can be coupled to one or more electrode layer regions 853, which in some examples can be electrically unconnected to touch node electrodes 501A through 501D, traces 502A through 502d, or bonding regions 509A and 509B in layer 810. Conductive line 855 and one or more of bonding pads 846A and 846B can be made of the same conductive material (e.g., copper), and can be deposited as a single layer 840 between electrode layers 810 and electrode layer 850 (e.g., conductive line 855 and/or bonding pads 846A and 846B may be in contact with electrode layer 810 and/or electrode layer 850). However, conductive line 855 can be electrically unconnected to bonding pads 846A and 846B. Gaps 848A, 848B, and 848C between substrate layer 830 and electrode layer 850 can be filled with a passivation material for providing electrical isolation and structural support. A purpose of conductive line 855 is to lower the effective sheet resistance of electrode layer 850 by coupling electrode layer 850 to a conductive material of lower resistance, thereby potentially improving the shielding performance of electrode layer 850 and the scalability of the touch sensor panel.

Figure 9A:
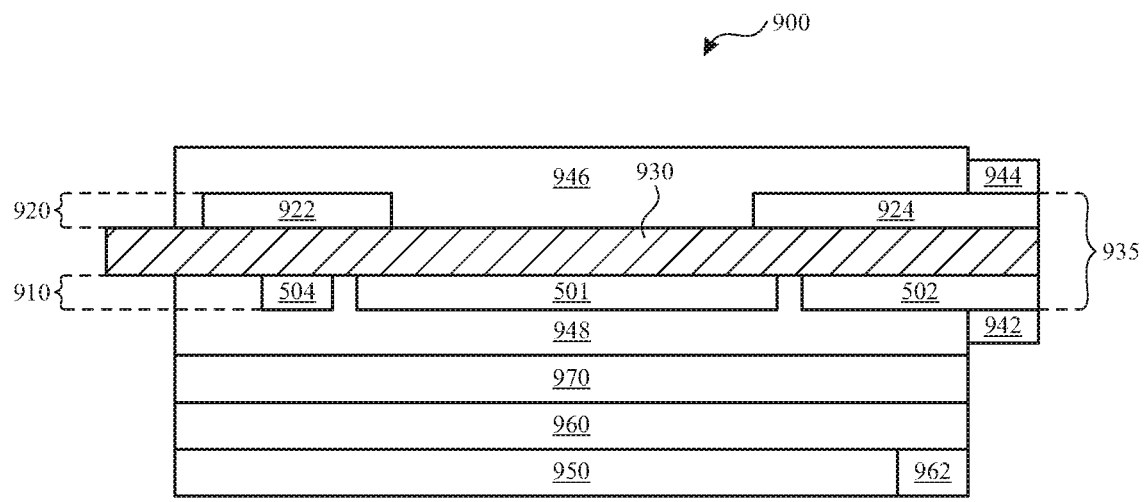

FIG. 9A illustrates an exemplary material stackup 900 of a touch sensor panel with a single standalone substrate layer, a touch electrode layer disposed below the substrate layer, a top shield electrode layer, a bottom shield electrode layer, and a polarizer, depicted along cross-section A-A' in FIG. 5A, according to examples of the disclosure. FIG. 9A shows an electrode layer 910, an electrode layer 920, and a substrate layer 930 in a dual-layer configuration, as described above with respect to FIG. 6 and dual-layer structure 660. In the example shown in FIG. 9A, electrode layer 910 is disposed below substrate layer 930, and electrode layer 920 is disposed above substrate layer 930 (e.g., electrode layer 910 and/or electrode layer 920 may be in contact with substrate layer 930 on opposite surfaces of substrate layer 930). Electrode layer 910 includes touch node electrode 501, and traces 502 and 504, as shown in FIGS. 5A-5B. In the example shown in FIG. 9A, touch node electrode 501 and traces 502 and 504 can be comprised of a conductive material, and may be formed by patterning a single layer of that material (e.g., using photolithography and etching techniques). Trace 502 may include a bonding pad region electrically coupled to a first bonding pad 942 disposed below substrate 930 and trace 502 (e.g., bonding pad 942 may be in contact with trace layer 502), to connect trace 502 to first sense circuitry, such as shown in FIGS. 2, 3A, and/or 3B. (Trace 504 may be electrically coupled to second sense circuitry, which may be different from the first sense circuitry, via a bonding pad not shown in FIG. 9A.)

In the example shown in FIG. 9A, electrode layer 920 can function as a top shield that provides noise shielding for traces 502 and 504 from noise sources located above electrode layer 920. This shielding may be beneficial, for example, to protect the traces from interference from noise generated from above the touch sensor panel, such as from the contact environment. In the example shown, electrode layer 920 includes shielding regions 922 and 924, which may be comprised of a conductive material (e.g., ITO), and may be formed by patterning a single layer of that material (e.g., using photolithography and etching techniques). However, other conductive materials may be used. In FIG. 9A, shielding regions 922 and 924 may be disposed directly above traces 504 and 502, respectively, and provide top shielding for those respective traces. Shielding regions 922 and 924 may correspond to shielding regions 512 and 510 in FIG. 5B, which can similarly provide top shielding for traces 504 and 502. In the example shown, electrode layer 920 does not include material disposed directly above the touch node electrode 501 and thus may not provide top shielding for touch node electrode 501. This is because top shielding of touch node electrode 501 could dampen the touch sensor panel's ability to detect changes in capacitance, as by limiting the extent and/or flux of fringing electric fields extending above touch node electrode 501, with which an object, such as a user's finger, may capacitively interact.

In some examples, shielding region 924 may include a bonding pad region electrically coupled to a second bonding pad 944, which may be disposed above substrate layer 930 and shielding region 924 (e.g., bonding pad 944 may be in contact with shielding region 924), to connect electrode layer 920 to first drive circuitry. The first drive circuitry may apply a guard signal, which may be an AC or DC voltage signal, to shielding region 924 (and, via conductive material not shown in FIG. 9A, to shielding region 922).

In the example shown in FIG. 9A, substrate layer 930, electrode layer 910 (which may be formed on one side of substrate layer 930), and electrode layer 920 (which may be formed on the opposite side of substrate layer 930) can be viewed as a dual-layer structure 935, analogous to the dual-layer structure 660 in FIG. 6. In some examples, passivation layers can be added above and below dual-layer structure 935, for example to protect dual-layer structure 935 from environmental hazards (e.g., scratching, moisture). In the example shown in FIG. 9A, a first passivation layer 946 may be disposed above dual-layer structure 935. That is, passivation layer 946 may be disposed above substrate layer 930 and electrode layer 920 (e.g., passivation layer 946 may be in contact with substrate layer 930 and/or shielding regions 922 and 924). Similarly, a second passivation layer 948 may be disposed below dual-layer structure 935. That is, passivation layer 948 may be disposed below substrate layer 930, touch node electrode 501, and traces 502 and 504, such that touch node electrode 501 and traces 502 and 504 may be disposed between substrate layer 930 and passivation layer 948 (e.g., passivation layer 948 may be in contact with substrate layer 930, touch node electrode 501, and/or traces 502 and 504).

In the example shown in FIG. 9A, the example stackup 900 includes a third electrode layer, shown in the figure as electrode layer 950. Unlike in the example shown in FIG. 6, however, electrode layer 950 in example stackup 900 need not be formed on a surface of a standalone substrate layer. Instead, electrode layer 950 can be formed on a surface of a polarizer 960, which may be a circular polarizer on the surface of (or otherwise part of) a display (e.g., electrode layer 950 may be in contact with polarizer 960). In the example shown in FIG. 9A, dual-layer structure 935, along with passivation layers 946 and 948, may be laminated to polarizer 960, with adhesive layer 970 disposed between dual-layer structure 935 and polarizer 960. That is, adhesive layer 970 may be disposed below passivation layer 948 and above polarizer 960 (e.g., adhesive layer 970 may be in contact with passivation layer 948 and polarizer 960). In the example shown in FIG. 9A, electrode layer 950 can function as a bottom shield that provides noise shielding for touch node electrode 501 and traces 502 and 504, which may be disposed directly above electrode layer 950, from noise sources (such as a display) that may be located below electrode layer 950. Electrode layer 950 may be formed by coating polarizer 960 with a single layer of conductive material. Electrode layer 950 may be comprised of nanowire materials or ITO, for example, although other conductive materials may be used.

Electrode layer 950 may be electrically coupled to one or more bonding pads, to connect to second drive circuitry. In some examples, such as shown in FIG. 9A, the one or more bonding pads may include bonding pad 962, which can be disposed below polarizer layer 960 (e.g., bonding pad 962 may be in contact with polarizer layer 960). The second drive circuitry may apply a guard signal, which may be an AC or DC voltage signal, to electrode layer 950. (The second drive circuitry may be, but need not be, the same as the first drive circuitry.)

Figure 9B:
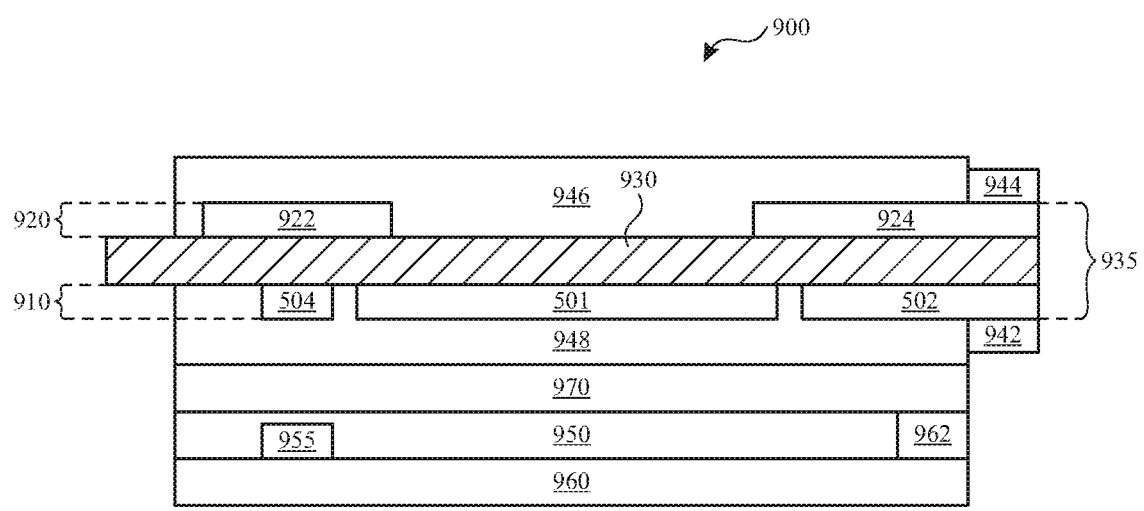

FIG. 9B illustrates an exemplary material stackup 900 of a touch sensor panel with a single standalone substrate layer, a touch electrode layer disposed below the substrate layer, a top shield electrode layer, a bottom shield electrode layer, and a polarizer, depicted along cross-section A-A' in FIG. 5A, according to examples of the disclosure. Unlike the example stackup shown in FIG. 9A, in which electrode layer 950 is disposed below polarizer 960, the example stackup shown in FIG. 9B shows electrode layer 950 disposed above polarizer 960. In examples such as shown in FIG. 9B, electrode layer 950 can be formed on the top surface of polarizer 960 (e.g., electrode layer 950 may be in contact with polarizer 960), which in some examples may be integrated into a display (not shown). Electrode layer 950 may be coupled to drive circuitry via a bonding pad, such as bonding pad 962, disposed above polarizer 960 (e.g., bonding pad 962 may be in contact with polarizer 960). In the example shown in FIG. 9B, example stackup 900 includes a conductive line 955 to reduce the effective sheet resistance of electrode layer 950, such as described above with respect to FIG. 5A. In the example shown, conductive line 955 is shown disposed between polarizer 960 and electrode layer 950 (e.g., conductive line 955 may be in contact with polarizer 960 and/or electrode layer 950, and conductive line 955 may be embedded in electrode layer 950). Other examples may not include conductive line 955.

Figure 9C:
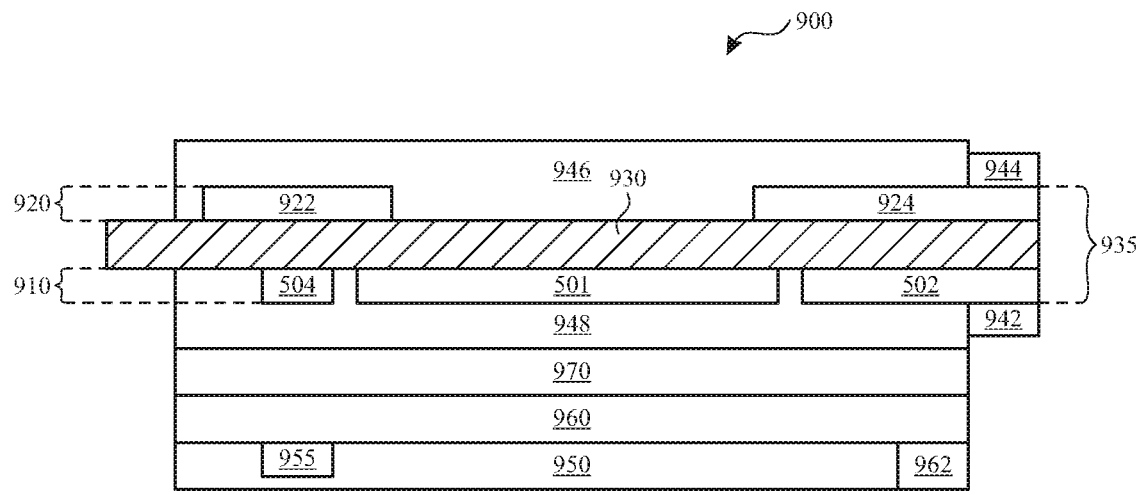
Figure 9D:
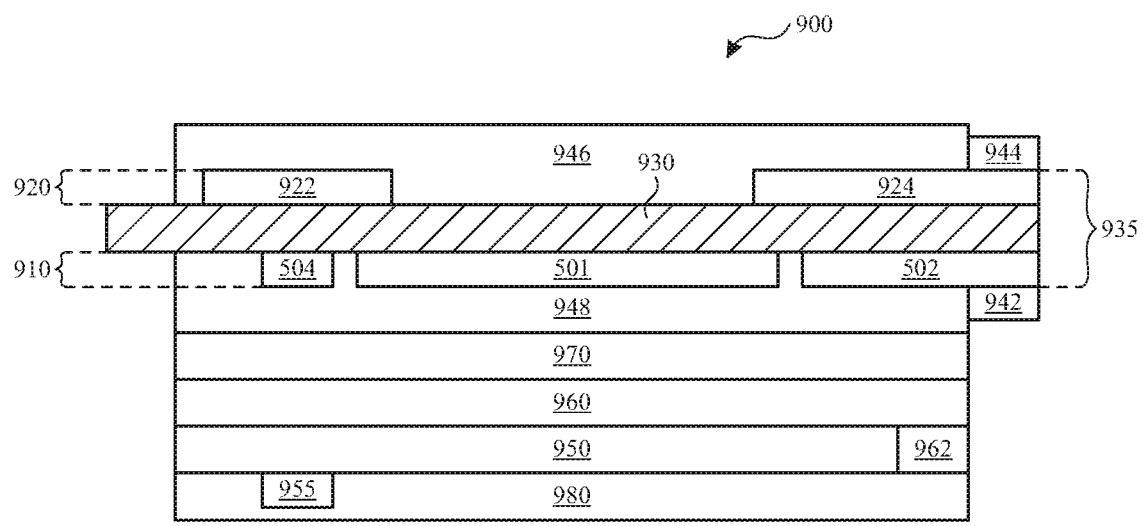

FIGS. 9C and 9D show further examples of stackup 900 that include a conductive line 955 to reduce the effective sheet resistance of electrode layer 950, such as described above with respect to FIG. 5A and FIG. 9B. In some examples of stackup 900 that include a conductive line 955, such as shown in FIG. 9C, conductive line 955 may be disposed below polarizer 960 (e.g., conductive line 955 may be in contact with polarizer 960). Electrode layer 950 may be formed on the bottom surfaces of polarizer 960 and conductive line 955 (e.g., electrode layer 950 may be in contact with polarizer 960 and/or conductive line 955, and conductive line 955 may be embedded in electrode layer 950). In some examples, such as shown in FIG. 9D, conductive line 955 may be disposed below electrode layer 950 (e.g., conductive line 955 may be in contact with electrode layer 950). A passivation layer 980 may be formed on the bottom surfaces of electrode layer 950 and conductive line 955 (e.g., passivation layer 980 may be in contact with electrode layer 950 and/or conductive line 955, and conductive line 955 may be embedded in passivation layer 980). In the examples of both FIGS. 9C and 9D, the inclusion and electrical coupling of conductive line 955 to electrode layer 950 can lower the overall sheet resistance of electrode layer 950, allowing for better touch sensor performance, and potentially allowing example 900 to scale to larger panel sizes more easily than examples that do not include the conductive line.

Example stackup 900 may provide several advantages over example stackup 690 shown in FIG. 6. In example stackup 690, electrode layer 610 (which includes touch node electrode 601 and traces 602) can be bottom-shielded from noise by electrode layer 650, where electrode layer 610 and electrode layer 650 are on opposite sides of a standalone substrate layer (substrate layer 640) in a dual-layer structure. However, in stackup 900, bottom shielding of electrode layer 910 (which includes touch node electrode 501 and traces 502 and 504) can instead be provided by electrode layer 950. Unlike in example stackup 690, electrode layer 910 and electrode layer 950 are not separated by a standalone substrate layer in a dual-layer structure. Instead, electrode layer 910 and electrode layer 950 are both disposed on the same side of substrate layer 930, with electrode layer 950 formed on polarizer 960 (which may be incorporated into a display) instead of on a standalone substrate layer. Compared to example stackup 690, the configuration of example stackup 900 eliminates one standalone substrate layer (e.g., substrate layer 640 in FIG. 6), potentially eliminating the touch sensor panel thickness associated with that substrate layer. Moreover, in some examples in which the touch sensor panel is part of a touch screen, example stackup 900 may integrate the touch sensor panel into a display, which can reduce the thickness of the resulting touch screen stackup. Further, in some examples in which a touch sensor panel is integrated into a display, a polarizer component of the display (e.g., polarizer 960 in FIG. 9A) can be used as a substrate on which an electrode layer (e.g., electrode layer 950) can be formed. Economic efficiencies can be gained, and fabrication of some touch screen examples may be simplified, by this shared use of components. Meanwhile, shielding of touch node electrode 501 and traces 502 and 504 need not be compromised by the elimination of a standalone substrate layer, as electrode layer 910 (which includes touch node electrode 501 and traces 502 and 504) is shielded in the example from both the top and the bottom, similar to electrode layer 610 in FIG. 6.

In some examples, such as shown in FIGS. 9A-9D, electrode layer 950 can be comprised of nanowire materials, such as silver nanowire. An advantage that can be conveyed by nanowire materials is that they can exhibit improved mechanical flexibility over some other conductive materials (e.g., ITO), potentially allowing example 900 to be more structurally robust than example 690 in FIG. 6. Further, nanowire materials may exhibit lower sheet resistance than some other conductive materials. Similarly, in examples that include a conductive line coupled to an electrode layer, such as described above and shown in FIGS. 9B, 9C, and 9D, that conductive line may contribute to lower sheet resistance. This lower sheet resistance can allow for more effective shielding and better touch sensor performance, and may allow example 900 to scale to larger panel sizes more easily than example 690.

Figures 1, 9E:
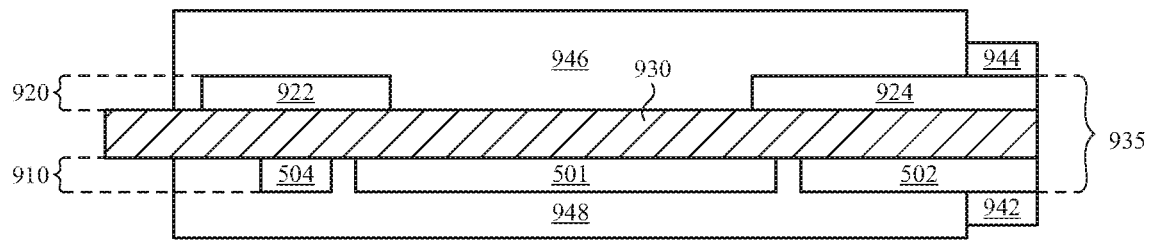
Figures 2, 9E:
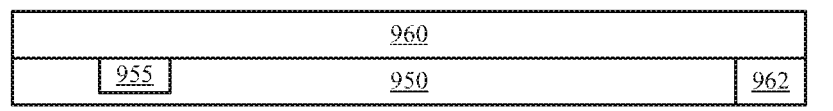
Figures 3, 9E:
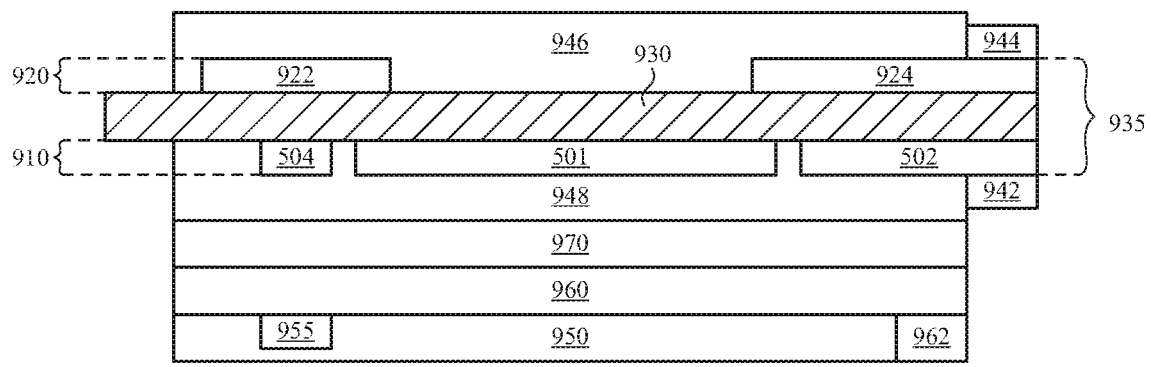

FIGS. 9E-1 through 9E-3 illustrate an example process for forming exemplary material stackup 900, as shown in FIG. 9C. Electrode layers 910, 920 (e.g., shielding regions 922 and 924), and 950, substrate layer 930, passivation layers 946 and 948, bonding pads 942, 944, and 962, polarizer 960, and conductive line 955 are as shown in FIG. 9C. FIG. 9E-1 shows stackup 900 after a standard annealing process, the result of which may include a dual-layer structure 935 as shown in FIG. 9C—electrode layers 910 and 920 formed on opposite sides of substrate layer 930—with passivation layers 946 and 948 on the top and bottom sides, respectively, of dual-layer structure 935. In FIG. 9E-1, electrode layer 950 and polarizer 960 (shown in FIG. 9C) are not shown.

FIG. 9E-2 shows electrode layer 950 formed below polarizer 960 of example stackup 900, for example via a lamination process (e.g., electrode layer 950 may be in contact with polarizer 960), with electrode layer 950 coupled to bonding pad 962, disposed below polarizer 960 (e.g., bonding pad 962 may be in contact with polarizer 960). (In some examples, such as shown in FIG. 9B, electrode layer 950 and bonding pad 962 may be formed above polarizer 960.) In some examples in which the touch sensor panel is part of a touch screen, polarizer 960 and electrode layer 950 may be integrated into a display (not shown). The dual-layer structure 935, with the addition of passivation layers 946 and 948, can be laminated (via lamination process 975) to polarizer 960. Lamination process 975 may add adhesive layer 970 between polarizer 960 and the passivation layer 948 below dual-layer stackup 935. (In some examples, such as shown in FIG. 9B, in which electrode layer 950 may be disposed above polarizer 960, adhesive layer 970 may be disposed between electrode layer 950 and passivation layer 948.) A result of this lamination process is the example stackup 900 as shown in FIG. 9A (reproduced as FIG. 9E-3 for clarity). Other processes can additionally or alternatively be used to form example stackup 900.

According to the above, some examples of the disclosure are directed to a touch sensor panel stackup comprising: a first substrate layer; a first electrode layer comprising one or more of a touch electrode and a trace configured to couple the touch electrode to sense circuitry, the first electrode layer located on a first side of the first substrate layer; a second electrode layer located on the first side of the first substrate layer; a passivation layer disposed in between the first electrode layer and the second electrode layer; and a third electrode layer located on a second side of the first substrate layer, different from the first side of the first substrate layer, wherein: the first electrode layer is comprised of a first conductive material, the second electrode layer is comprised of a second conductive material, the third electrode layer is comprised of a third conductive material, and the touch sensor panel stackup does not include a second substrate layer between the first substrate layer and the second electrode layer. Additionally or alternatively to one or more of the examples disclosed above, in some examples the second electrode layer is configured to shield the first electrode layer from first noise, and the third electrode layer is configured to shield the first electrode layer from second noise. Additionally or alternatively to one or more of the examples disclosed above, in some examples the first electrode layer is in contact with the passivation layer and the second electrode layer is in contact with the passivation layer. Additionally or alternatively to one or more of the examples disclosed above, in some examples the first electrode layer is in contact with a surface of the first substrate layer on the first side of the first substrate layer. Additionally or alternatively to one or more of the examples disclosed above, in some examples the third electrode layer is in contact with a surface of the first substrate layer on the second side of the first substrate layer. Additionally or alternatively to one or more of the examples disclosed above, in some examples the first electrode layer comprises a touch electrode and a trace, the second electrode layer is configured to shield the trace, the second electrode layer is configured to not shield a region of the touch electrode, and the third electrode layer is configured to shield the trace and the touch electrode. Additionally or alternatively to one or more of the examples disclosed above, in some examples the touch sensor panel stackup further comprises a conductive line electrically coupled to the third electrode layer and configured to lower an effective sheet resistance of the third electrode layer. Additionally or alternatively to one or more of the examples disclosed above, in some examples the conductive line is disposed on a surface of the third electrode layer. Additionally or alternatively to one or more of the examples disclosed above, in some examples the conductive line is embedded in the third electrode layer. Additionally or alternatively to one or more of the examples disclosed above, in some examples the conductive line is in contact with the first substrate layer. Additionally or alternatively to one or more of the examples disclosed above, in some examples the first electrode layer comprises a touch electrode and a trace, the second electrode layer is configured to shield the trace and the touch electrode, the third electrode layer is configured to shield the trace, and the third electrode layer is configured to not shield a region of the touch electrode. Additionally or alternatively to one or more of the examples disclosed above, in some examples the touch sensor panel stackup further comprises a conductive line electrically coupled to the second electrode layer and configured to lower an effective sheet resistance of the second electrode layer. Additionally or alternatively to one or more of the examples disclosed above, in some examples the conductive line is disposed on a surface of the second electrode layer. Additionally or alternatively to one or more of the examples disclosed above, in some examples the conductive line is coupled to a region of the first electrode layer. Additionally or alternatively to one or more of the examples disclosed above, in some examples the touch sensor panel stackup further comprises one or more bonding pads, wherein the conductive line and the one or more bonding pads comprise a layer. Additionally or alternatively to one or more of the examples disclosed above, in some examples the second electrode layer is in contact with a component of a display. Additionally or alternatively to one or more of the examples disclosed above, in some examples the component is a polarizer. Additionally or alternatively to one or more of the examples disclosed above, in some examples the touch sensor panel stackup further comprises a conductive line electrically coupled to the second electrode layer and configured to lower an effective sheet resistance of the second electrode layer. Additionally or alternatively to one or more of the examples disclosed above, in some examples the conductive line is disposed on a surface of the polarizer. Additionally or alternatively to one or more of the examples disclosed above, in some examples the conductive line is disposed on a surface of the second electrode layer. Additionally or alternatively to one or more of the examples disclosed above, in some examples the second electrode layer is configured to be coupled to first drive circuitry, and the third electrode layer is configured to be coupled to second drive circuitry. Additionally or alternatively to one or more of the examples disclosed above, in some examples the first drive circuitry is the second drive circuitry. Additionally or alternatively to one or more of the examples disclosed above, in some examples the first electrode layer is coupled to one or more bonding pads disposed on the first side of the first substrate layer, and the second electrode layer is coupled to one or more bonding pads disposed on the first side of the first substrate layer. Additionally or alternatively to one or more of the examples disclosed above, in some examples the one or more bonding pads coupled to the first electrode layer and the one or more bonding pads coupled to the second electrode layer comprise a same layer. Additionally or alternatively to one or more of the examples disclosed above, in some examples one or more of the first conductive material, the second conductive material, and the third conductive material includes silver nanowire. Additionally or alternatively to one or more of the examples disclosed above, in some examples one or more of the first conductive material, the second conductive material, and the third conductive material includes indium tin oxide. Additionally or alternatively to one or more of the examples disclosed above, in some examples one or more of the first conductive material, the second conductive material, and the third conductive material includes a metal mesh. Additionally or alternatively to one or more of the examples disclosed above, in some examples the touch electrode is configured to receive a stimulation signal, one or both of the second electrode layer and the third electrode layer is configured to receive a guard signal, and the guard signal is referenced to the stimulation signal.

Some examples of the disclosure are directed to a method for fabricating a touch sensor panel, the method comprising: forming a first substrate layer; forming a first electrode layer, the first electrode layer located on a first side of the first substrate layer, wherein the first electrode layer comprises one or more of a touch electrode and a trace configured to couple the touch electrode to sense circuitry; forming a second electrode layer located on the first side of the first substrate layer; forming a passivation layer disposed in between the first electrode layer and the second electrode layer; and forming a third electrode layer located on a second side of the first substrate layer, different from the first side of the first substrate layer, wherein the first electrode layer is comprised of a first conductive material, the second electrode layer is comprised of a second conductive material, the third electrode layer is comprised of a third conductive material, and the touch sensor panel does not include a second substrate layer between the first substrate layer and the second substrate layer. Additionally or alternatively to one or more of the examples disclosed above, in some examples the second electrode layer is configured to shield the first electrode layer from first noise, and the third electrode layer is configured to shield the first electrode layer from second noise.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:
1. A touch sensor panel stackup comprising:
   a substrate;
   a first electrode layer formed from a first conductive material and including one or more touch electrodes and one or more traces configured to couple the one or more touch electrodes to sense circuitry, the first electrode layer located on a first side of the substrate;
   a second electrode layer formed from a second conductive material and located on a second side of the substrate, different from the first side;
   a polarizer formed on the first side of the substrate; and
   a third electrode layer formed from a third conductive material and located on the first side of the substrate;
   wherein the second electrode layer is configured to shield the first electrode layer from first noise, and the third electrode layer is configured to shield the first electrode layer from second noise.

2. The touch sensor panel stackup of claim 1, wherein the third electrode layer is formed on the polarizer.

3. The touch sensor panel stackup of claim 1, wherein a location of the second electrode layer is limited to keep the one or more touch electrodes substantially unshielded from one or more objects proximate to the second side of the substrate.

4. The touch sensor panel stackup of claim 1, wherein the second electrode layer is configured to receive a guard signal.

5. The touch sensor panel stackup of claim 1, further comprising a passivation layer disposed between the first electrode layer and the polarizer.

6. The touch sensor panel stackup of claim 5, wherein the substrate, first and second electrode layers, and the passivation layer are laminated to the polarizer and the third electrode layer.

7. The touch sensor panel stackup of claim 1, further comprising a passivation layer disposed over the second electrode layer.

8. The touch sensor panel stackup of claim 1, wherein the third electrode layer comprises nanowire materials.

9. The touch sensor panel stackup of claim 1, wherein the third electrode layer is configured to receive a guard signal.

10. The touch sensor panel stackup of claim 1, wherein the polarizer is disposed between the first electrode layer and the third electrode layer.

11. The touch sensor panel stackup of claim 1, wherein the third electrode layer is disposed between the first electrode layer and the polarizer.

12. The touch sensor panel stackup of claim 11, further comprising at least one conductive line electrically coupled to the third electrode layer and configured to lower an effective sheet resistance of the third electrode layer.

13. The touch sensor panel stackup of claim 12, wherein the at least one conductive line is disposed on a surface of the third electrode layer.

14. The touch sensor panel stackup of claim 12, wherein the at least one conductive line is embedded in the third electrode layer.

15. The touch sensor panel stackup of claim 11, wherein the polarizer is incorporated into a display.

16. A method for reducing an effect of noise on a touch sensor panel stackup, comprising:
   supporting first shielding on a front side of a substrate for shielding one or more traces formed on a back side of the substrate from first noise, the one or more traces configured to couple one or more touch electrodes to sense circuitry; and
   supporting second shielding on a polarizer located on the back side of the substrate for shielding the one or more traces from second noise.

17. The method of claim 16, further comprising locating the first shielding to keep the one or more touch electrodes substantially unshielded from one or more objects proximate to the front side of the substrate.

18. The method of claim 16, further comprising driving the first shielding with a guard signal.

19. The method of claim 16, further comprising disposing the polarizer between the one or more touch electrodes and the second shielding.

20. The method of claim 16, further comprising disposing the second shielding between the one or more touch electrodes and the polarizer.

* * * * *